(12) United States Patent
Yan et al.

(10) Patent No.: US 10,930,151 B2
(45) Date of Patent: Feb. 23, 2021

(54) ROADSIDE PARKING MANAGEMENT METHOD, DEVICE, AND SYSTEM BASED ON MULTIPLE CAMERAS

(71) Applicant: INTELLIGENT INTER CONNECTION TECHNOLOGY CO., LTD., Zhangjiakou (CN)

(72) Inventors: Jun Yan, Beijing (CN); Yanping Xiang, Beijing (CN); Xueming Yang, Beijing (CN)

(73) Assignee: INTELLIGENT INTER CONNECTION TECHNOLOGY CO., LTD., Zhangjiakou (CN)

( * ) Notice: Subject to any disclaimer, the term of this patent is extended or adjusted under 35 U.S.C. 154(b) by 0 days.

(21) Appl. No.: 16/762,508

(22) PCT Filed: Mar. 7, 2018

(86) PCT No.: PCT/CN2018/078300
§ 371 (c)(1),
(2) Date: May 8, 2020

(87) PCT Pub. No.: WO2019/095588
PCT Pub. Date: May 23, 2019

(65) Prior Publication Data
US 2020/0380864 A1 Dec. 3, 2020

(30) Foreign Application Priority Data
Nov. 16, 2017 (CN) .......................... 201711135187.6

(51) Int. Cl.
*G06K 9/00* (2006.01)
*B60Q 1/48* (2006.01)
(Continued)

(52) U.S. Cl.
CPC .......... *G08G 1/147* (2013.01); *G06K 9/00711* (2013.01); *G06K 9/00771* (2013.01); *G08G 1/0175* (2013.01); *G06K 2009/00738* (2013.01)

(58) Field of Classification Search
USPC ....... 382/100, 103–107, 155, 162, 172, 173, 382/181, 189, 209, 219, 224, 254, 276,
(Continued)

(56) References Cited

U.S. PATENT DOCUMENTS 7,369,940 B2 * 5/2008 Frank ........................ B60R 1/00
340/932.2
2014/0188580 A1 * 7/2014 Nerayoff ................ G06Q 20/02
705/13
(Continued)

FOREIGN PATENT DOCUMENTS

CN 101470967 A 7/2009
CN 103824474 A 5/2014
(Continued)

*Primary Examiner* — Seyed H Azarian
(74) *Attorney, Agent, or Firm* — Bayramoglu Law Offices LLC

(57) ABSTRACT

A roadside parking management method includes: receiving a monitoring area image captured by a camera; dividing the monitoring area image to obtain a plurality of tracking detection areas in the monitoring area image; monitoring at least one of a vehicle and a license plate in the monitoring area image; and determining parking event information according to a tracking detection area where the at least one of the vehicle and the license plate is located. The method can improve the management efficiency of parking events.

9 Claims, 7 Drawing Sheets

(51) Int. Cl.
*G08G 1/14* (2006.01)
*G08G 1/017* (2006.01)

(58) Field of Classification Search
USPC ......... 382/291, 305, 312; 705/13; 340/932.2
See application file for complete search history.

(56) References Cited

U.S. PATENT DOCUMENTS

| | | | |
|---|---|---|---|
| 2014/0200970 A1* | 7/2014 | Nerayoff | G06Q 20/145 |
| | | | 705/13 |
| 2014/0249896 A1* | 9/2014 | Nerayoff | G08G 1/00 |
| | | | 705/13 |
| 2020/0134332 A1* | 4/2020 | Vossoughi | G08G 1/146 |

FOREIGN PATENT DOCUMENTS

| | | | |
|---|---|---|---|
| CN | 105957395 A | 9/2016 | |
| CN | 107134145 A | 9/2017 | |
| CN | 107767673 A | 3/2018 | |
| GB | 0616976 | 10/2006 | |

\* cited by examiner

ROADSIDE PARKING MANAGEMENT
METHOD, DEVICE, AND SYSTEM BASED
ON MULTIPLE CAMERAS

CROSS REFERENCE TO THE RELATED
APPLICATIONS

This application is the national phase entry of International Application No. PCT/CN2018/078300, filed on Mar. 7, 2018, which is based upon and claims priority to Chinese Patent Application No. 201711135187.6, filed on Nov. 16, 2017, the entire contents of which are incorporated herein by reference.

TECHNICAL FIELD

The present disclosure relates to the technical field of target detection, and more particularly, to a parking management method, device, and system, and a computer-readable storage medium.

BACKGROUND

As the number of vehicles in the city continues to increase, parking spaces are designated on both sides of the road in many cities to control vehicle congestion and manage parking. Under this parking scheme vehicles are not restricted by guardrails and barrier gates when entering or exiting. Since the vehicular arrangement is parallel on both sides of the roadway, this is often referred to as roadside parking, road-occupied parking or on-street parking. Such parallel parking lots typically require numerous persons to manage, direct and attend to the unique vehicular arrangement to minimize damage to property and person. This management method, however, has shortcomings such as inconsistent fee standards, poor time management, missed or excessive charging, difficulty in obtaining parking evidence and tracing back, and difficulties common to most twenty-four-hour operations. Additionally, since attendants are expected to work long hours under inefficient conditions, there is an increased risk to personal safety due to accidents and crime. Therefore, current roadside parking management and methods present numerous challenges to be solved in the context of general urban management.

Among the roadside parking management schemes developed in recent years, includes the use of geomagnetic sensors and parking management employing different types of cameras. The management scheme based on the linkage of bullet cameras and dome cameras is achieved by known master-slave bullet cameras linked to dome cameras, which include a group of bullet cameras (i.e., a group of multiple cameras having fixed mounting visual angles and focal lengths, hereinafter referred to as bullet camera) and a dome camera (i.e., a camera capable of automatically adjusting the installation angle and focal length).

In use, the bullet cameras and the dome camera are mounted on the horizontal arm of an L-shaped monitoring pole on the roadside, and the bullet camera and the dome camera on the L-shaped monitoring pole are linked, which is achieved by the following method: the bullet camera is adjusted to a fixed focal length and an installation angle to detect parking events, and the focal length and angle of the dome camera are adjusted to capture images of a target vehicle according to the detection result of the bullet camera, so as to obtain parking evidence of the vehicle. In this way, the detection of parking events and the capturing of vehicle and license plate images run in parallel, thereby capturing the multiple vehicles in different parking spaces within a broad area.

The technical solution in the prior art mentioned above has the following shortcomings. The visual angles of the bullet cameras and the dome camera are limited by the position of the mounting pole, and one target vehicle can only be captured from a single direction. Moreover, it takes time (i.e., the response time) to invoke the dome camera to perform the capturing task. Due to the above-mentioned issues, the dome camera is restricted to capture only one image once, which affects the capturing efficiency of the dome camera and causes the consequent problems such as missed capturing, low recognition efficiency, complex management, and low management efficiency when concurrent parking events occur.

SUMMARY

In view of the above-mentioned problems, the present disclosure provides a technical solution for parking management to improve parking management efficiency.

According to some embodiments of the present disclosure, a parking management method is provided, including: receiving a monitoring area image captured by a camera; dividing the monitoring area image according to a preset image division rule to obtain a plurality of tracking detection areas in the monitoring area image; monitoring at least one of a vehicle and a license plate in the monitoring area image, and determining parking event information according to a tracking detection area selected from the plurality of tracking detection areas, wherein the at least one of the vehicle and the license plate is located in the tracking detection area.

Optionally, the plurality of tracking detection areas include a parking space area, an entry detection area, and an exit detection area; the parking event information includes a license plate number of the vehicle, a type of a parking event, and a parking space where the vehicle is located when the parking event occurs.

Optionally, the entry detection area includes an area adjacent to a boundary of the parking space area; the exit detection area includes an area outside the parking space area.

Optionally, acquiring a first monitoring area image from the monitoring area images captured by the camera; setting coordinates of the tracking detection area in the first monitoring area image; and dividing the monitoring area images subsequently captured by the camera according to the coordinates.

Optionally, performing vehicle detection in the tracking detection area to determine the vehicle in the plurality of tracking detection areas; performing license plate detection in the tracking detection area to determine the license plate in the plurality of tracking detection areas; recognizing the license plate to determine the license plate number of the license plate; performing motion detection on the vehicle and the license plate to determine a motion state of the vehicle and the license plate, wherein the motion state includes a stationary state and a moving state; determining the parking event information of the vehicle according to the motion state of the vehicle; and determining the parking event information of the vehicle identified by the license plate according to the motion state of the license plate.

Optionally, acquiring a positional relationship between the license plate and the vehicle; when a license plate area of the license plate is located in a vehicle area of the vehicle, determining a result of the license plate detection and the vehicle detection, wherein the result indicates that both the vehicle and the license plate of the vehicle are detected and/or the license plate number of the license plate is recognized; when the license plate area of the license plate is not located in the vehicle areas of any vehicles, determining a result of the license plate detection and the vehicle detection, wherein the result indicates that only the license plate is detected and/or the license plate number of the license plate is recognized, and the vehicle identified by the license plate is not detected; when the vehicle area of the vehicle does not include license plate areas of any license plates, determining a result of the license plate detection and the vehicle detection, wherein the result indicates that only the vehicle is detected, and the license plate of the vehicle and the license plate number of the license plate are not detected.

Optionally, when the motion state of the vehicle is the stationary state, determining the parking event information of the vehicle according to the tracking detection area where the vehicle is located; when the motion state of the license plate is the stationary state, determining the parking event information of the vehicle identified by the license plate according to the tracking detection area where the license plate is located; when the motion state of the vehicle is the moving state, tracking the vehicle to determine the parking event information of the vehicle; when the motion state of the license plate is the moving state, tracking the license plate to determine the parking event information of the vehicle identified by the license plate.

Optionally, the step of determining the parking event information of the vehicle identified by the license plate according to the tracking detection area where the license plate is located includes: when the license plate is located in the parking space area and the license plate number of the license plate is recognized, according to the license plate number, searching an on-the-spot vehicle information table to determine whether the license plate number has been recorded in the on-the-spot vehicle information table; when the license plate number is not recorded in the on-the-spot vehicle information table, determining that the vehicle identified by the license plate is an entering vehicle, and determining and recording the license plate number of the vehicle identified by the license plate, an entry time of the vehicle, and the parking space in which the vehicle is located; when the license plate is located in the entry detection area or the exit detection area, calculating a time for which the license plate stays in the entry parking area or the exit parking area; when the time exceeds a first threshold, determining that the vehicle identified by the license plate is an illegal vehicle, and determining that the parking event of the vehicle identified by the license plate is an illegal parking event.

Optionally, the step of determining the parking event information of the vehicle according to the tracking detection area where the vehicle is located includes: when the vehicle is located in the parking space area and the license plate number of the vehicle is not recognized, according to the license plate, searching the on-the-spot vehicle information table to determine whether the vehicle has been recorded in the on-the-spot vehicle information table; when the vehicle is not recorded in the on-the-spot vehicle information table, determining that the vehicle is an entering vehicle, and determining and recording the entry time of the vehicle and the parking space in which the vehicle is located; when the vehicle is located in the entry detection area or the exit detection area, calculating the time for which the vehicle stays in the entry parking area or the exit parking area; when the time exceeds the first threshold, determining that the vehicle is an illegal vehicle and the parking event of the vehicle is an illegal parking event.

Optionally, when the vehicle in the tracking detection area image is detected, and the license plate of the vehicle is detected or the license plate number is recognized, selecting the vehicle area as an initial target vehicle area for tracking, and selecting the license plate area and a surrounding area of the license plate as an initial target license plate area for tracking; when the vehicle in the tracking detection area is detected and the license plate of the vehicle is not detected, selecting the vehicle area as an initial target vehicle area for tracking; when the vehicle in the tracking detection area image is not detected and the license plate of the vehicle is detected or the license plate number is recognized, selecting a license plate image and a surrounding area of the license plate image as an initial target license plate area for tracking.

Optionally, selecting the latest image of the vehicle to update the target vehicle area; selecting a latest license plate image of the vehicle and an image of the surrounding area of the license plate image to update the target license plate area.

Optionally, when the vehicle crosses a parking line and enters a parking space in the parking space area from the entry detection area, calculating a time for which the vehicle stays in the parking space; when the license plate crosses the parking line and enters the parking space in the parking space area from the entry detection area, calculating a time for which the license plate stays in the parking space;

Optionally, when the time for which the vehicle stays in the parking space exceeds a second threshold, determining that the vehicle is an entering vehicle and the parking event of the vehicle is an entry parking event, and determining entry parking event information, and recording the entry parking event information in the on-the-spot vehicle information table;

Optionally, when the time for which the license plate stays in the parking space exceeds the second threshold, determining that the vehicle identified by the license plate is an entering vehicle, and the parking event of the vehicle identified by the license plate is an entry parking event, and determining the entry parking event information, and recording the entry parking event information in the on-the-spot vehicle information table. The entry parking event information includes the license plate number, the entry time, the parking space where the vehicle is located when the entry parking event occurs, an entry key point image, an entry key time-series image, and an entry tracking video.

Optionally, when the time for which the vehicle stays in the parking space exceeds the second threshold, stopping tracking the vehicle and continuing to perform the motion detection on the vehicle; when the time for which the license plate stays in the parking space exceeds the second threshold, stopping tracking the license plate and continuing to perform the motion detection on the license plate.

Optionally, the entry key point image includes: an image of the vehicle first detected in the entry detection area, a license plate image of the vehicle first detected in the entry detection area, an image of the vehicle crossing the parking line and enters the parking space area from the entry detection area, and an image of the vehicle parked in the parking space.

Optionally, the entry key time-series image is a proceedings image selected and extracted from the entry tracking video.

Optionally, the entry tracking video is a video segment from a time when the vehicle is first detected in the entry detection area to a time when the vehicle is parked in the parking space.

Optionally, when the vehicle enters the exit detection area from the parking space in the parking space area, determining that the vehicle is an exiting vehicle, and determining exit parking event information of the vehicle; when the license plate enters the exit detection area from the parking space in the parking space area, determining that the vehicle identified by the license plate is an exiting vehicle, and determining the exit parking event information of the vehicle identified by the license plate. The exit parking event information includes the license plate number, an exit time, the parking space where the vehicle is located when the exit parking event occurs, an exit key point image, an exit key time-series image, and an exit tracking video.

Optionally, the exit key point image includes an image of the vehicle parked in the parking space before the vehicle exits, an image of the vehicle first detected in the exit detection area, a license plate image of the vehicle first detected in the exit detection area, an image of the vehicle crossing the parking line and enters the exit detection area from the parking space area, an image of the vehicle last detected in the exit detection area, and a license plate image of the vehicle last detected in the exit detection area.

Optionally, the exit key time-series image is a proceedings image selected and extracted from the exit tracking video.

Optionally, the exit tracking video includes a first exit tracking video and a second exit tracking video. The first exit tracking video is a video segment from a time when the vehicle enters the exit detection area from the parking space area to a time when the vehicle disappears from the exit detection area. The second exit tracking video is a video segment from a time when the vehicle is first detected in the exit detection area to a time when the vehicle disappears from the exit detection area.

Optionally, when the license plate is tracked in the exit detection area and the license plate number of the license plate is recognized, according to the license plate number, searching the on-the-spot vehicle information table to determine whether the license plate number has been recorded in the on-the-spot vehicle information table; when the license plate number has been recorded before, determining that the vehicle identified by the license plate is an exiting vehicle, and determining the license plate number, the exit time, and the parking space of the vehicle identified by the license plate.

According to other embodiments of the present disclosure, a parking management device includes a processor, wherein the processor is configured to receive the monitoring area image captured by the camera, divide the monitoring area image to obtain the plurality of tracking detection areas in the monitoring area image, and monitor vehicles and license plates in the tracking detection area to determine the parking event information. The parking management device further includes a memory configured to store the monitoring area image and the parking event information.

Optionally, the tracking detection area image includes the parking space area, the entry detection area, and the exit detection area; the parking event information includes the license plate number of the vehicle, the type of the parking event, and the parking space where the vehicle is located when the parking event occurs.

Optionally, the parking management device further includes a display configured to display an operation management interface. The operation management interface is configured to receive a first query instruction input by a user. The first query instruction is an operation that the user selects to query the monitoring information of the camera. The operation management interface is configured to acquire the monitoring area image captured by the camera according to the first query instruction, and display the monitoring area image. The operation management interface is configured to receive the coordinates of the tracking detection area selected by the user in the monitoring area image. The monitoring area image is divided according to the coordinates of the tracking detection area.

Optionally, the processor performs vehicle detection in each tracking detection area to determine the vehicle in each tracking detection area. The processor performs license plate detection in each of the tracking detection areas to determine the license plate in each tracking detection area. The processor recognizes the license plate to determine a license plate number of the license plate. The processor performs motion detection on the vehicle and the license plate to determine a motion state of the vehicle and the license plate, wherein the motion state includes a stationary state and a moving state. The processor determines the parking event information of the vehicle and the license plate according to the motion state of the vehicle and the license plate.

Optionally, the processor obtains a positional relationship between the license plate and the vehicle. When the license plate area of the license plate is located in the vehicle area of the vehicle, the processor determines a result of the license plate detection and the vehicle detection, wherein the result indicates that both the vehicle and the license plate and/or the license plate number of the license plate are detected. When the license plate area of the license plate is not located in vehicle areas of any vehicles, the processor determines a result of the license plate detection and the vehicle detection, wherein the result indicates that only the license plate and/or the license plate number of the license plate are/is detected, and the vehicle identified by the license plate is not detected. When the vehicle area of the vehicle does not include the license plate areas of any license plates, the processor determines a result of the license plate detection and the vehicle detection, wherein the result indicates that only the vehicle is detected, and the license plate of the vehicle and the license plate number of the license plate are not detected.

Optionally, when the motion state of the vehicle is the stationary state, the processor determines the parking event information of the vehicle according to the tracking detection area where the vehicle is located. When the motion state of the license plate is the stationary state, the processor determines the parking event information of the vehicle identified by the license plate according to the tracking detection area where the license plate is located. When the motion state of the vehicle is the moving state, the processor tracks the vehicle to determine the parking event information of the vehicle. When the motion state of the license plate is the moving state, the processor tracks the license plate to determine the parking event information of the vehicle identified by the license plate.

Optionally, when the license plate is located in the parking space area and the license plate number of the license plate is recognized, the processor searches the on-the-spot vehicle information table to determine whether the license plate number has been recorded in the on-the-spot vehicle information table according to the license plate number. When the license plate number is not recorded in the on-the-spot vehicle information table, the processor determines that the vehicle identified by the license plate is an entering vehicle, and determines and records the license plate number of the vehicle identified by the license plate, the entry time of the vehicle, and the parking space in which the vehicle is located. When the vehicle is located in the parking space area and the license plate number of the vehicle is not recognized, according to the license plate, the processor searches the on-the-spot vehicle information table to determine whether the vehicle has been recorded in the on-the-spot vehicle information table. When the vehicle is not recorded in the on-the-spot vehicle information table, the processor determines that the vehicle is an entering vehicle, and determines and records the entry time of the vehicle and the parking space in which the vehicle is located.

Optionally, when the vehicle is located in the parking space area and the license plate number of the vehicle is not recognized, according to the vehicle, the processor searches the on-the-spot vehicle information table to determine whether the vehicle has been recorded in the on-the-spot vehicle information table. When the vehicle is not recorded in the on-the-spot vehicle information table, the processor determines that the vehicle is an entering vehicle, and determines and records the entry parking event information of the vehicle. The entry parking event information includes the entry time of the vehicle and the parking space where the vehicle is located. When the vehicle is located in the entry detection area or the exit detection area, the processor calculates the time for which the vehicle stays in the entry parking area or the exit parking area. When the time exceeds the first threshold, the processor determines that the vehicle is an illegal vehicle, and the parking event of the vehicle is an illegal parking event.

Optionally, when the vehicle in the tracking detection area image is detected, and the license plate of the vehicle or the license plate number of the vehicle is detected, the processor selects the vehicle area as the initial target vehicle area for tracking, and selects the license plate area and the surrounding area of the license plate of the vehicle as the initial target license plate area for tracking. When the vehicle in the tracking detection area is detected but the license plate of the vehicle is not detected by the processor, the processor selects the vehicle area as the initial target vehicle area for tracking. When the vehicle in the tracking detection area image is not detected but the license plate of the vehicle or the license plate number of the vehicle is detected, the processor selects the license plate image and the surrounding area of the license plate image as the initial target license plate area for tracking.

Optionally, the processor selects the latest image of the vehicle to update the target vehicle area. The processor selects the latest license plate image of the vehicle and an image of the surrounding area of the license plate image to update the target license plate area.

Optionally, when the vehicle crosses the parking line and enters the parking space in the parking space area from the entry detection area, the processor calculates the time for which the vehicle stays in the parking space. When the license plate crosses the parking line and enters the parking space in the parking space area from the entry detection area, the processor calculates the time for which the license plate stays in the parking space. When the time for which the vehicle stays in the parking space exceeds the second threshold, the processor determines that the vehicle is an entering vehicle and the parking event of the vehicle is an entry parking event, determines the entry parking event information, and records the entry parking event information in the on-the-spot vehicle information table. When the time for which the license plate stays in the parking space exceeds the second threshold, the processor determines that the vehicle identified by the license plate is an entering vehicle and the parking event of the vehicle identified by the license plate is an entry parking event, and determines and records the entry parking event information in the on-the-spot vehicle information table. The entry parking event information includes the license plate number, the entry time, the parking space where the vehicle is located when the entry parking event occurs, the entry key point image, the entry key time-series image, and the entry tracking video.

Optionally, when the time for which the vehicle stays in the parking space exceeds the second threshold, the processor stops tracking the vehicle and continues to perform the motion detection on the vehicle. When the time for which the license plate stays in the parking space exceeds the second threshold, the processor stops tracking the license plate and continues to perform the motion detection on the license plate.

Optionally, the entry key point image includes: an image of the vehicle first detected in the entry detection area, a license plate image of the vehicle first detected in the entry detection area, an image of the vehicle crossing the parking line and enters the parking space area from the entry detection area, and a proceedings image of the vehicle parked in the parking space.

Optionally, the entry key time-series image is an image selected and extracted from the entry tracking video.

Optionally, the entry tracking video is a video segment from a time when the vehicle is first detected in the entry detection area to a time when the vehicle is parked in the parking space.

Optionally, when the vehicle enters the exit detection area from the parking space in the parking space area, the processor determines that the vehicle is an exiting vehicle, and determines the exit parking event information of the vehicle. When the license plate enters the exit detection area from the parking space in the parking space area, the processor determines that the vehicle identified by the license plate is an exiting vehicle, and determines the exit parking event information of the vehicle identified by the license plate. The exit parking event information includes the license plate number, the exit time, the parking space where the vehicle is located when the exit parking event occurs, the exit key point image, the exit key time-series image, and the exit tracking video.

Optionally, the exit key point image includes an image of the vehicle parked in the parking space before the vehicle exits, an image of the vehicle first detected in the exit detection area, a license plate image of the vehicle first detected in the exit detection area, an image of the vehicle crossing the parking line and enters the exit detection area from the parking space area, an image of the vehicle last detected in the exit detection area, and a license plate image of the vehicle last detected in the exit detection area.

Optionally, the exit key time-series image is a proceedings image selected and extracted from the exit tracking video.

Optionally, the exit tracking video includes a first exit tracking video and a second exit tracking video. The first exit tracking video is a video segment from a time when the vehicle enters the exit detection area from the parking space area to a time when the vehicle disappears from the exit detection area. The second exit tracking video is a video segment from a time when the vehicle is first detected in the exit detection area to a time when the vehicle disappears from the exit detection area.

Optionally, when the license plate is tracked in the exit detection area and the license plate number of the license plate is recognized, the processor searches the on-the-spot vehicle information table to determine whether the license plate number has been recorded in the on-the-spot vehicle information table according to the license plate number. When the license plate number has been recorded in the on-the-spot vehicle information table before, the processor determines that the vehicle identified by the license plate is an exiting vehicle, and determines the license plate number, the exit time, and the parking space of the vehicle identified by the license plate.

According to some embodiments of the present disclosure, a parking management device includes an input module, configured to receive the monitoring area image captured by the camera; an image division module, configured to divide the monitoring area image according to a preset image division rule to obtain a plurality of tracking detection areas in the monitoring area image; a detection recognition tracking module, configured to monitor vehicles and license plates in the tracking detection area to determine the parking event information.

Optionally, the tracking detection area image includes the parking space area, the entry detection area, and the exit detection area. The parking event information includes the license plate number of the vehicle, the type of the parking event, and the parking space where the vehicle is located when the parking event occurs.

Optionally, the entry detection area includes an area adjacent to both sides of the boundary of the parking space area, and the exit detection area includes an area outside the parking space area.

Optionally, the parking management device further includes an operation management interface. The operation management interface is configured to receive a first query instruction input by the user, wherein the first query instruction is an operation that the user selects to query the monitoring information of the camera. The operation management interface is configured to acquire a first monitoring area image captured by the camera according to the first query instruction, and display the first monitoring area image. The operation management interface is configured to receive the coordinates of the tracking detection area selected by the user in the monitoring area image. The image division rule of the camera is based on the coordinates of the tracking detection area.

Optionally, the coordinates of the tracking detection area include coordinates of the parking space area, coordinates of the entry detection area, and coordinates of the exit detection area.

Optionally, the detection recognition tracking module includes: a vehicle detection module, configured to perform vehicle detection on the tracking detection area by using a vehicle detection algorithm to determine the vehicle in the tracking detection area; a license plate detection module, configured to perform license plate detection on the tracking detection area by using a license plate detection algorithm to determine the license plate in the tracking detection area; a license plate recognition module, configured to recognize the license plate by using a license plate recognition algorithm to determine the license plate number of the license plate; a motion detection module, configured to perform motion detection on the vehicle and the license plate by using a motion detection algorithm to determine the motion state of the vehicle and the license plate, wherein the motion state of the target vehicle and the target license plate includes a stationary state and a moving state; and a tracking processing module, configured to determine the parking event information of the vehicle and the license plate according to the motion state of the vehicle and the license plate.

Optionally, the detection recognition tracking module further includes an operation judgment module configured to obtain a positional relationship between the license plate and the vehicle. When the license plate area of the license plate is located in the vehicle area of the vehicle, the operation judgment module determines a result of the license plate detection and the vehicle detection, wherein the result indicates that both the vehicle and the license plate of the vehicle and/or the license plate number of the vehicle are detected. When the license plate area of the license plate is not located in the vehicle areas of any vehicles, the operation judgment module determines a result of the license plate detection and the vehicle detection, wherein the result indicates that only the license plate and/or the license plate number of the license plate are/is detected, but the vehicle identified by the license plate is not detected. When the vehicle area of the vehicle does not include the license plate areas of any license plates, the operation judgment module determines a result of the license plate detection and the vehicle detection, wherein the result indicates that only the vehicle is detected but the license plate of the vehicle and the license plate number of the license plate are not detected.

Optionally, when the motion state of the vehicle is the stationary state, the tracking processing module determines the parking event information of the vehicle according to the tracking detection area where the vehicle is located. When the motion state of the license plate is the stationary state, the tracking processing module determines the parking event information of the vehicle identified by the license plate according to the tracking detection area where the license plate is located. When the motion state of the vehicle is the moving state, the tracking processing module tracks the vehicle to determine the parking event information of the vehicle. When the motion state of the license plate is the moving state, the tracking processing module tracks the license plate to determine the parking event information of the vehicle identified by the license plate.

Optionally, when the license plate is located in the parking space area and the license plate number of the license plate is recognized by the license plate recognition module, the tracking processing module searches the on-the-spot vehicle information table to determine whether the license plate number has been recorded in the on-the-spot vehicle information table according to the license plate number. When the license plate number is not recorded in the on-the-spot vehicle information table, the tracking processing module determines that the vehicle identified by the license plate is an entering vehicle, and determines and records the license plate number of the vehicle identified by the license plate, the entry time of the vehicle, and the parking space in which the vehicle is located.

Optionally, when the license plate is located in the entry detection area or the exit detection area, the tracking processing module calculates a time for which the license plate stays in the entry parking area or the exit parking area. When the time exceeds the first threshold, the tracking processing module determines that the vehicle identified by the license plate is an illegal vehicle, and the parking event of the vehicle identified by the license plate is an illegal parking event.

Optionally, when the vehicle is located in the parking space area and the license plate number of the vehicle is not recognized by the license plate recognition module, the tracking processing module searches the on-the-spot vehicle information table to determine whether the vehicle has been recorded in the on-the-spot vehicle information table according to the license plate. When the vehicle is not recorded in the vehicle information table, the tracking processing module determines that the vehicle is an entering vehicle, and determines and records the entry parking event information of the vehicle. The entry parking event information of the vehicle includes the entry time of the vehicle and the parking space where the vehicle is located.

Optionally, when the vehicle is located in the entry detection area or the exit detection area, the tracking processing module calculates a time for which the vehicle stays in the entry parking area or the exit parking area. When the time exceeds the first threshold, the tracking processing module determines that the vehicle is an illegal vehicle, and the parking event of the vehicle is an illegal parking event.

Optionally, when the vehicle in the tracking detection area image is detected by the vehicle detection module, and the license plate of the vehicle is detected by the license plate detection module or the license plate number is recognized by the license plate recognition module, the tracking processing module activates a vehicle tracking module to select the vehicle area as an initial target vehicle area for tracking, and activates a license plate tracking module to select the license plate area and the surrounding area of the license plate as an initial target license plate area for tracking. When the vehicle in the tracking detection area is detected by the vehicle detection module but the license plate of the vehicle is not detected by the license plate detection module, the tracking processing module activates the vehicle tracking module to select the vehicle area as an initial target vehicle area for tracking. When the vehicle in the tracking detection area image is not detected by the vehicle detection module, but the license plate of the vehicle is detected by the license plate detection module or the license plate number is recognized by the license plate recognition module. The tracking processing module activates the license plate tracking module to select the license plate image and the surrounding area of the license plate image as the initial target license plate area for tracking.

Optionally, the vehicle tracking module selects the latest image of the vehicle to update the target vehicle area. The license plate tracking module selects the latest license plate image of the vehicle and an image of the surrounding area of the license plate image to update the target license plate area.

Optionally, when the vehicle crosses the parking line and enters the parking space in the parking space area from the entry detection area, the tracking processing module calculates the time for which the vehicle stays in the parking space. When the license plate crosses the parking line and enters the parking space in the parking space area from the entry detection area, the tracking processing module calculates the time for which the license plate stays in the parking space. When the time for which the vehicle stays in the parking space exceeds the second threshold, the tracking processing module determines that the vehicle is an entering vehicle, the parking event of the vehicle is an entry parking event, and determines and records the entry parking event information in the on-the-spot vehicle information table. When the time for which the license plate stays in the parking space exceeds the second threshold, the tracking processing module determines that the vehicle identified by the license plate is an entering vehicle and the parking event of the vehicle identified by the license plate is an entry parking event, and determines and records the entry parking event information in the on-the-spot vehicle information table. The entry parking event information includes the license plate number, the entry time, the parking space where the vehicle is located when the entry parking event occurs, the entry key point image, the entry key time-series image, and the entry tracking video.

Optionally, when the time for which the vehicle stays in the parking space exceeds the second threshold, the tracking processing module stops tracking the vehicle, and the motion detection module continues to perform the motion detection on the vehicle. When the time for which the license plate stays in the parking space exceeds the second threshold, the tracking processing module stops tracking the vehicle identified by the license plate, and the motion detection module continues to perform the motion detection on the vehicle identified by the license plate.

Optionally, the entry key point image includes: an image of the vehicle first detected in the entry detection area, a license plate image of the vehicle first detected in the entry detection area, an image of the vehicle crossing the parking line and enters the parking space area from the entry detection area, and an image of the vehicle parked in the parking space.

Optionally, the entry key time-series image is an image selected and extracted from the entry tracking video.

Optionally, the entry tracking video is a video segment from a time when the vehicle is first detected in the entry detection area to a time when the vehicle is parked in the parking space.

Optionally, when the vehicle enters the exit detection area from the parking space in the parking space area, the tracking processing module determines that the vehicle is an exiting vehicle, and determines the exit parking event information of the vehicle. When the license plate enters the exit detection area from the parking space in the parking space area, the tracking processing module determines that the vehicle identified by the license plate is an exiting vehicle, and determines the exit parking event information of the vehicle identified by the license plate. The exit parking event information includes the license plate number, the exit time, the parking space where the vehicle is located when the exit parking event occurs, the exit key point image, the exit key time-series image, and the exit tracking video.

Optionally, the exit key point image includes an image of the vehicle parked in the parking space before the vehicle exits, an image of the vehicle first detected in the exit detection area, a license plate image of the vehicle first detected in the exit detection area, an image of the vehicle crossing the parking line and enters the exit detection area from the parking space area, an image of the vehicle last detected in the exit detection area, and a license plate image of the vehicle last detected in the exit detection area.

Optionally, the exit key time-series image is a proceedings image selected and extracted from the exit tracking video.

Optionally, the exit tracking video includes a first exit tracking video and a second exit tracking video. The first exit tracking video is a video segment from a time when the vehicle enters the exit detection area from the parking space area to a time when the vehicle disappears from the exit detection area. The second exit tracking video is a video segment from a time when the vehicle is first detected in the exit detection area to a time when the vehicle disappears from the exit detection area.

Optionally, when the license plate in the exit detection area is tracked by the license plate tracking module, and the license plate number of the license plate is recognized by the license plate recognition module, the tracking processing module searches the on-the-spot vehicle information table to determine whether the license plate number has been recorded in the on-the-spot vehicle information table according to the license plate number. When the license plate number has been recorded in the on-the-spot vehicle information table before, the tracking processing module determines that the vehicle identified by the license plate is an exiting vehicle, and determines the license plate number of the vehicle identified by the license plate, the exit time, and the parking space where the vehicle identified by the license plate is located.

According to other embodiments of the present disclosure, a parking management system includes a camera group. The camera group is arranged on a pole of a roadside parking lot and configured to acquire the monitoring area image. The parking management system further includes the parking management device described in any one of the foregoing embodiments. The parking management device is configured to divide the monitoring area image according to an image division rule, and perform detection, recognition, and tracking processing on the monitoring area image to determine the parking event information of the parking space managed by the camera group.

Optionally, the camera group includes a plurality of camera sets, each of the plurality of camera sets includes at least one camera array, and each camera array includes at least one camera. One camera set is mounted on one pole, the camera set mounted on the first pole and the camera set mounted on the last pole each include a camera array, and each of a plurality of camera sets mounted on the remaining poles includes two camera arrays.

According to other embodiments of the present disclosure, a computer-readable storage medium is provided, wherein a computer program is stored in the computer-readable storage medium, and the program is executed by the processor to achieve the parking management method in any one of the embodiments mentioned above.

In the foregoing embodiments, since the camera, especially the bullet camera, has the characteristics of stable visual angle and focal length and can continuously collect stable images. For example, when the field of view of the current 2-megapixel bullet camera mounted on a 6-meter monitoring pole covers 2-3 parking spaces, a clear and stable license plate image can be captured. Therefore, based on the division of the images captured by the camera, the method and device provided by the present invention can simultaneously process the obtained image areas to realize the tracking and identification of the vehicles that enter and exit. Besides, when multiple concurrent parking events occur in several parking spaces monitored by one camera, the multiple parking events can be managed simultaneously according to the divided areas, without considering the dispatch response time of the camera compared to the management method of dome cameras. Therefore, the method provided by the embodiment of the present invention can improve the management efficiency of parking events.

Other features and advantages of the present disclosure will be clearly described hereinafter with reference to the illustrative embodiments and the drawings.

BRIEF DESCRIPTION OF THE DRAWINGS

The drawings described herein are intended to provide a further understanding of the present disclosure and constitute a part of the present disclosure. The illustrative embodiments of the present disclosure and the description thereof are intended to illustrate the present disclosure rather than limiting the present disclosure. In the drawings.

DETAILED DESCRIPTION OF THE EMBODIMENTS

Figure 1:
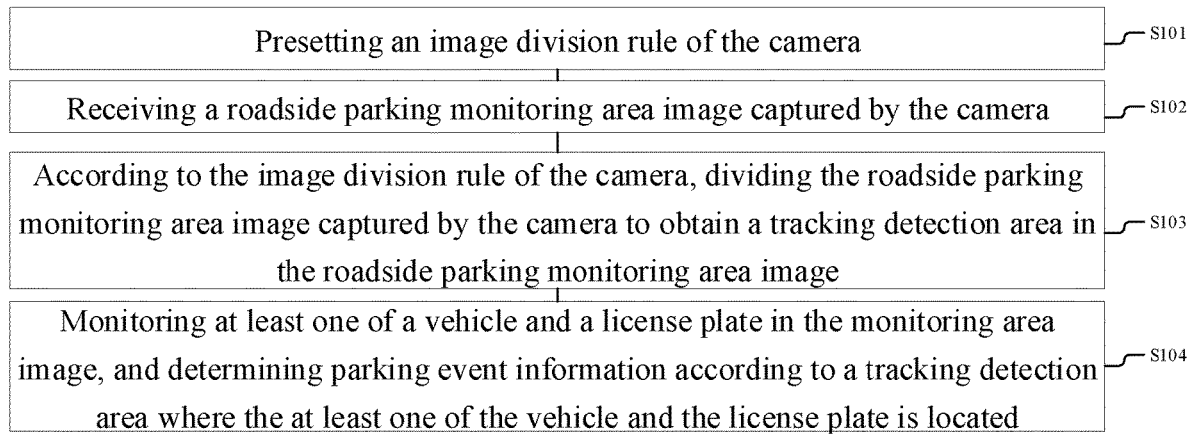
FIG. 1 is a schematic flow chart of the parking management method according to an embodiment of the present invention.

Various illustrative embodiments of the present disclosure will be described in detail hereinafter with reference to the drawings. It should be noted that, unless specifically stated otherwise, the relative arrangement of the components and steps, numerical expressions and numerical values described in these embodiments are not construed as a limitation on the scope of the present disclosure.

In addition, it should be understood that, in order to facilitate the description, the dimensions of various parts shown in the drawings are drawn without using the full-size scale.

The description of the following at least one illustrative embodiment is only illustrative and is not construed as any limitations on the present disclosure and the application thereof.

The technologies, methods, and devices known to those having ordinary skills in the art may not be discussed in detail, but in a certain context, the technologies, methods, and devices should be construed as a part of the patented specification.

In all embodiments shown and discussed herein, any specific value should be construed as an illustration rather than a limitation. Therefore, other embodiments of the illustrative embodiments may have different values.

It should be noted that similar reference numerals and letters indicate similar items in the drawings, and therefore, once an item is defined in one drawing, there is no need to further discuss this item in subsequent drawings.

FIG. 1 is a schematic flow chart of the parking management method according to an embodiment of the present invention.

As shown in FIG. 1, the method specifically includes steps S102-S104, and may further include step S101 in some embodiments. These steps can be specifically implemented as follows.

In step S101, an image division rule of a camera is preset. In some embodiments, the camera may be mounted in the manner shown in FIG. 2.

Figure 2:
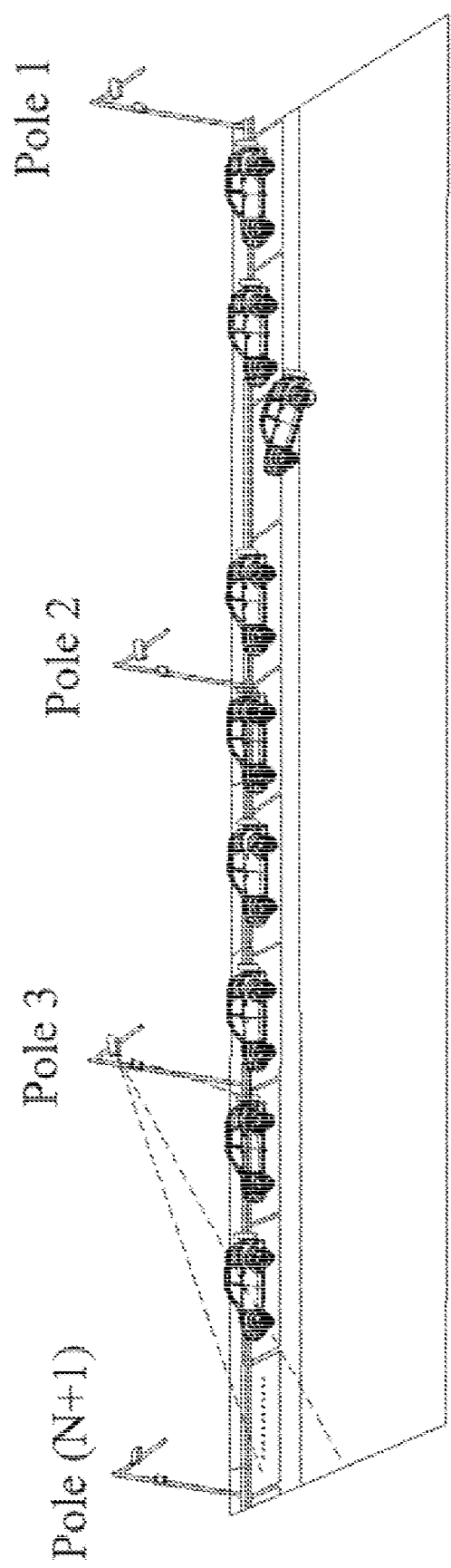
FIG. 2 is a schematic diagram showing an installation scenario of the camera array according to an embodiment of the present invention.

FIG. 2 is a schematic diagram showing an installation scenario of the camera array according to some embodiments of the present invention.

As shown in FIG. 2, several cameras can be configured as an array to form a camera group mounted and fixed on a pole in a roadside parking lot to monitor and manage roadside parking events. After the cameras are mounted, the parameters such as focal length and installation angle of each camera are set, and the roadside parking monitoring area managed by the camera is determined to obtain the monitoring information.

In some embodiments, a first monitoring area image may be acquired from the monitoring area image captured by the camera. The coordinates of the tracking detection area are set in the first monitoring area image, and a plurality of monitoring area images subsequently captured by the camera are divided according to the coordinates. For example, the latest captured frame can be selected from the plurality of monitoring area images captured by the camera as the first monitoring area image and configured to preset the image division rule of the camera. In other words, the coordinates of the tracking detection area in the first monitoring area image are selected and used as the image division rule of the camera and then stored to divide and recognize the monitoring area images subsequently captured by the camera according to the preset image division rule in the subsequent steps. The tracking detection area is a moving area of the vehicle, and may include a parking space area, an entry detection area, and an exit detection area. The coordinates of the tracking detection area include coordinates of the parking space area, the entry detection area, and the exit detection area in the first monitoring area image. For example, the first monitoring area image is shown in FIG. 2.

Figure 3:
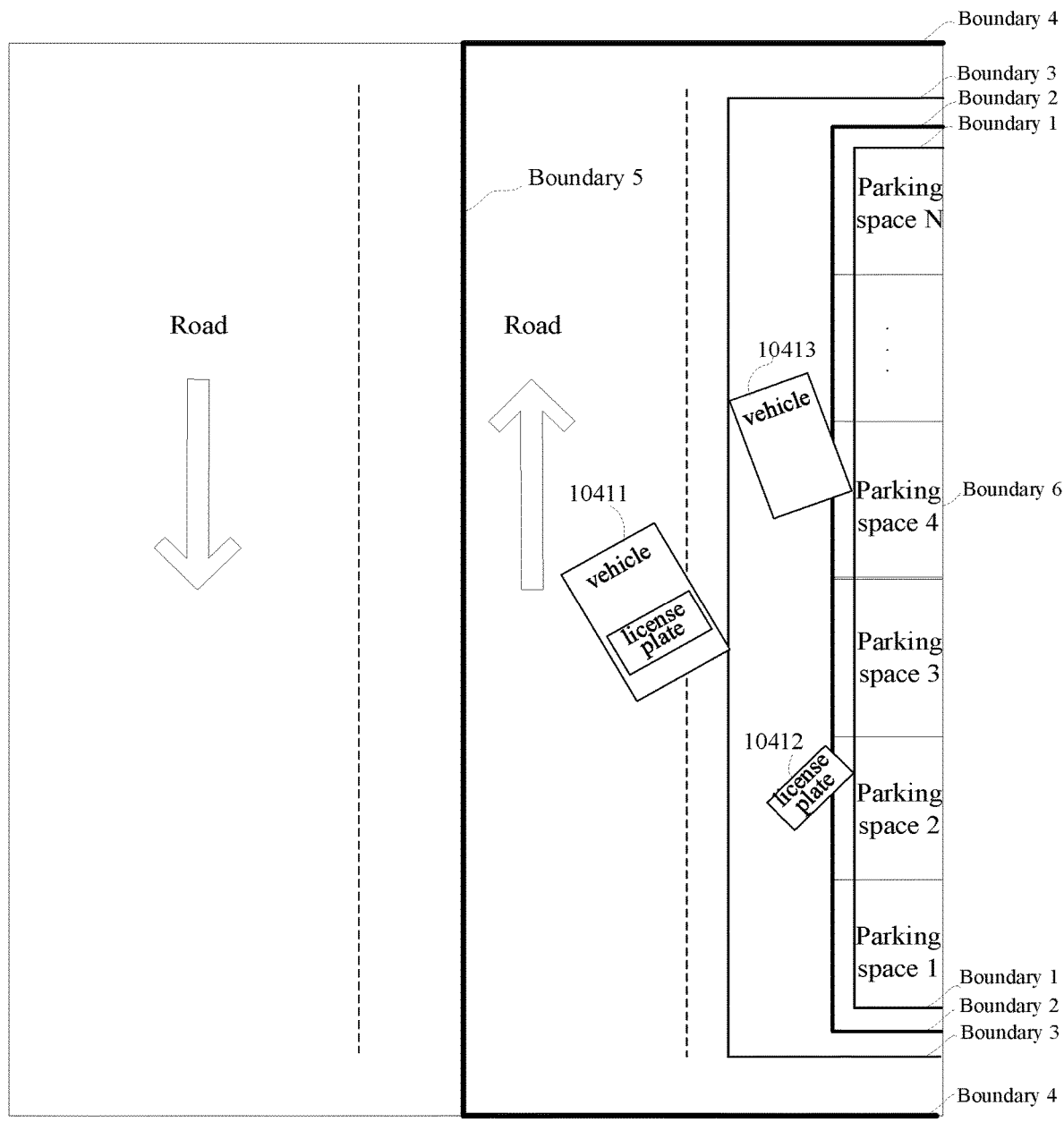
FIG. 3 is a schematic diagram of dividing the first monitoring area image according to an embodiment of the present invention.

FIG. 3 is a schematic diagram showing the first monitoring area image according to some embodiments of the present invention.

As shown in FIG. 3, the tracking detection area may include a parking space area, an entry detection area, and an exit detection area. In some embodiments, the parking space area, the entry detection area, and the exit detection area may be divided according to the following method.

The parking space area is an area for parking a vehicle, and includes a plurality of parking spaces, as shown in the area between the boundary 2 and the boundary 6 in FIG. 3.

The entry detection area includes adjacent areas on both sides of the boundary of the parking space area. The entry detection area can be used as an area for detecting an entry parking event and acquiring the entry parking event information. For example, as shown in FIG. 3, the boundary 2 in the figure is a boundary of the parking space area, also referred to as the parking line. The adjacent areas on both sides of the boundary refer to the area between boundary 1 and boundary 2 and the area between boundary 3 and boundary 2 (also the area between boundary 1 and boundary 3). The distance between boundary 2 and boundary 1 or boundary 3 can be set according to actual needs. Since the vehicle has a relatively slow speed when crossing the parking line, it is the right time to capture and recognize the license plate number. Therefore, the area between boundary 1 and boundary 2 can be used as a part of the entry detection area to greatly improve the efficiency and accuracy when capturing the license plate.

The exit detection area is an area outside the parking space area such as the area between boundary 2 and boundary 4, and between boundary 2 and boundary 5 in FIG. 3. The exit detection area may be used as an area for detecting an exit parking event and acquiring the exit parking event information.

In practical applications, the irrelevant areas (e.g., lawn areas, tree areas, etc.) in the image can be shielded according to the specific monitoring scenario of each camera and used as the tracking monitoring area of the vehicle, which can reduce the computation in the subsequent steps of processing images of the tracking monitoring area of the vehicle.

In step S102, the monitoring area image captured by the camera is received.

In step S103, the monitoring area image captured by the camera is divided according to the image division rule of the camera to obtain the plurality of tracking detection areas in the monitoring area image.

For example, the roadside parking monitoring area may include a parking space area, an entry detection area, and an exit detection area.

In step S104, at least one of the vehicle and the license plate in the monitoring area image is monitored, and the parking event information is determined according to the tracking detection area where the at least one of the vehicle and the license plate is located. The monitoring and processing method includes detection, recognition, and tracking.

In some embodiments, all vehicles and license plates in the entire monitoring area image can be detected and identified. Also, the multithreading or multiprocessing modules or multiprocessors can be used for parallel processing. For example, when the tracking detection area is processed, the multithreading or multiprocessing modules or multiprocessors concurrently detect and recognize vehicles and license plates in each tracking detection area. The detection and recognition efficiency of vehicles and license plates can be improved by means of parallel processing.

For example, the parking event may include an entry parking event, an exit parking event, and an illegal parking event with regulatory violations or rule violations. The parking event information may include the type of the parking event, the time at which the parking event occurs, the time at which the vehicle is parked in the parking space, the parking space where the vehicle is located when the parking event occurs, the license plate number, the key point image, the tracking video, and the key time-series image. After the parking event information is determined, the parking event information may be stored and subsequently uploaded to the background server to allow management personnel to perform queries and inspections.

The types of parking events may include entry parking events, exit parking events, and illegal parking events with regulatory violations or rule violations. The time at which the parking event occurs may include the time at which the vehicle enters the parking space (also referred to as the entry time), and the time at which the vehicle exits from the parking space (also referred to as the exit time). The parking time of the vehicle in the parking space can be calculated based on the exit time and the entry time of the vehicle.

The key point image may include an entry key point image and an exit key point image of the vehicle. The entry key point image may include an image of the vehicle first detected in the entry detection area, a license plate image of the vehicle first detected in the entry detection area, a proceedings image of the vehicle crossing the parking line and enters the parking space area from the entry detection area, and an image of the vehicle parked in the parking space. The exit key point image may include an image of the vehicle parked in the parking space before the vehicle exits, an image of the vehicle first detected in the exit detection area, a license plate image of the vehicle first detected in the exit detection area, an image of the vehicle crossing the parking line and enters the exit detection area from the parking space area, an image of the vehicle last detected in the exit detection area, and a license plate image of the vehicle last detected in the exit detection area. In actual parking management, when an abnormal parking event occurs (for example, the background server shows that there is a vehicle in the parking space, but the license plate is not displayed in the information), the operator can inspect the key point image to supplement the parking event information.

The tracking video may include the entry tracking video and the exit tracking video. The entry tracking video can be a video segment from a time when the vehicle is first detected in the entry detection area to a time when the vehicle is parked in the parking space. The exit tracking video includes a first exit tracking video and a second exit tracking video. The first exit tracking video is a video segment from a time when the vehicle enters the exit detection area from the parking space area to a time when the vehicle disappears from the exit detection area. The second exit tracking video is a video segment from a time when the vehicle is first detected in the exit detection area to a time when the vehicle disappears from the exit detection area. In general, the front-end equipment or device configured to execute the method has a limited processing capability. Therefore, the tracking video can be stored in advance based on the strong processing capability of the background server, and subsequently processed as needs. Alternatively, the tracking video can be uploaded to the background server to be identified and processed by the background server, which can further improve the accuracy of recognizing vehicles and license plates.

The key time-series image may include an entry key time-series image and an exit key time-series image. The entry key time-series images can be selected and extracted from the entry tracking video. The exit key time-series image can be selected and extracted from the exit tracking video.

Optionally, according to actual requirements, images at corresponding moments can be selected from the entry tracking video and combined to form the entry key time-series image, and images at corresponding moments can be selected from the exit tracking video segment and combined to form the exit key time-series image. The transmission of the tracking video requires a large bandwidth and excessive data traffic, while the transmission of the key time-series image requires a small bandwidth. Therefore, the key time-series image can be transmitted to the background server, and identified and processed by the background server, which further improves the accuracy of recognizing the vehicles and license plates.

Figure 4:
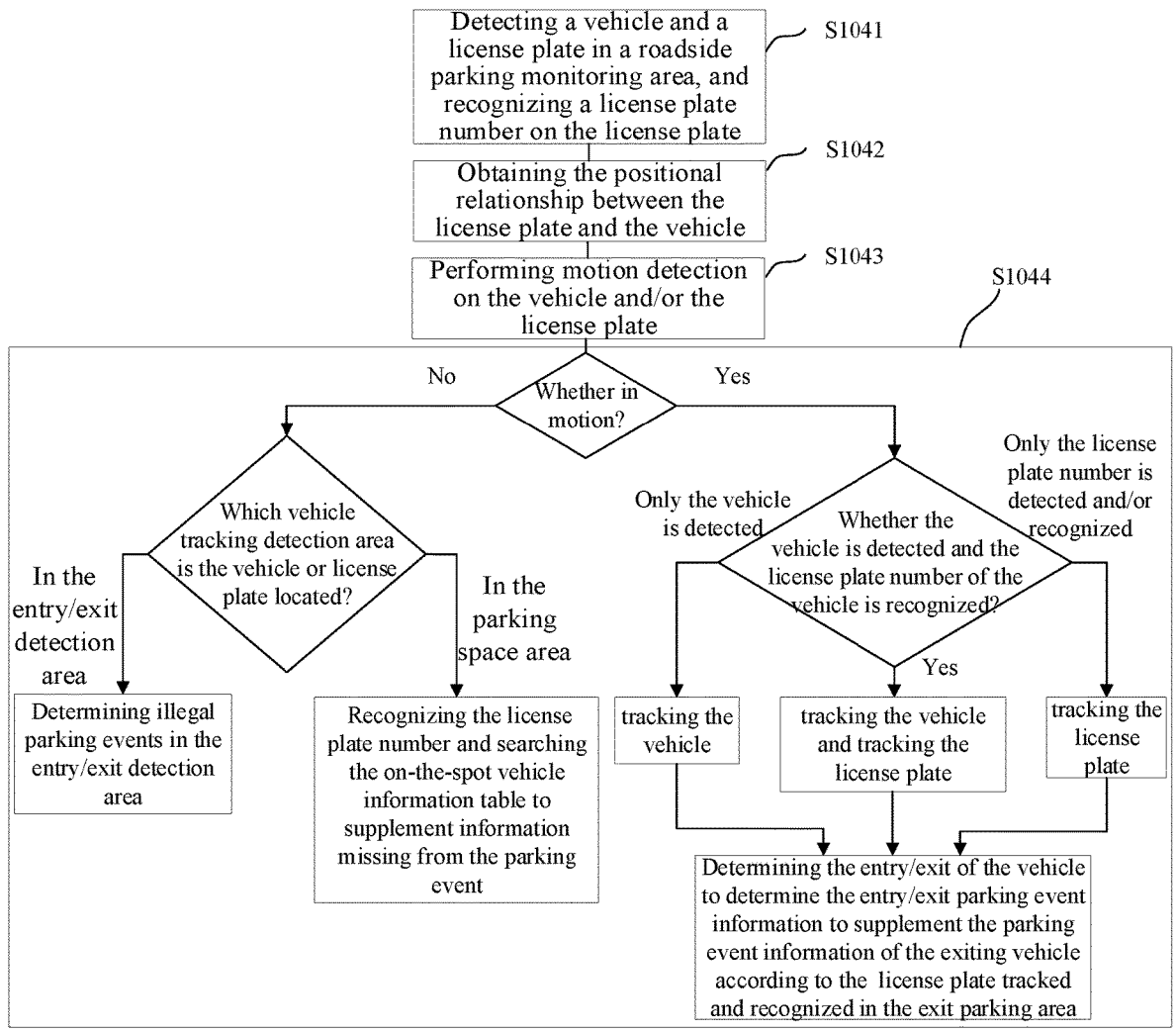
FIG. 4 is a schematic flow chart of a specific embodiment of step S104 in FIG. 1.

In some embodiments, step S104 may be implemented through the process shown in FIG. 4.

FIG. 4 shows a schematic flow chart of the method of determining the parking event information according to some embodiments of the present disclosure;

As shown in FIG. 4, step S104 can be implemented through steps S1041-S1044.

In step S1041, the vehicle detection is performed on the tracking detection area to determine the vehicle in the tracking detection area. The license plate detection is performed on the tracking detection area to determine a license plate in the tracking detection area, and the license plate is recognized to determine a license plate number of the license plate.

For example, a vehicle detection algorithm may be used for vehicle detection in the tracking detection area. A license plate detection algorithm may also be used for the license plate detection in the tracking detection area, and a license plate recognition algorithm may be used for recognizing the license plate.

Optionally, the vehicle detection algorithm and the license plate detection algorithm may include the Faster Regions with Convolutional Neural Networks features (Fast Rcnn) algorithm based on deep learning, the single shot multibox detector (SSD) algorithm, and the You Only Look Once (Yolo) algorithm or other types of image target detection algorithms.

In step S1042, the positional relationship between the license plate and the vehicle is acquired to determine whether the license plate belongs to the vehicle. For example, the vehicle and the license plate in the tracking detection area are determined to determine whether the license plate belongs to the vehicle according to the positional relationship between the vehicle and the license plate, which can be achieved by the following methods in some embodiments.

(1) If the license plate area of the license plate is located in the vehicle area of the vehicle, then it is determined that both the vehicle and the license plate of the vehicle are detected and/or the license plate number is recognized. For example, in the area 10411 shown in FIG. 3, the license plate area is located in the vehicle area, which indicates that the vehicle is detected and the license plate number of the vehicle is detected and/or identified. The license plate and the vehicle may be linked, and the characteristic information of the license plate may be merged with the characteristic information of the vehicle. Preferably, the coordinates of the license plate area are selected as the coordinates of the vehicle, and the vehicle area can be used as an auxiliary tracking area.

(2) If the license plate area of the license plate is not located in the vehicle areas of any vehicles, then it is determined that only the license plate of the vehicle is detected and/or the license plate number of the license plate is recognized, but the vehicle identified by the license plate is not detected. For example, in the area 10412 shown in FIG. 3, the license plate area is not located in any vehicle areas, which indicates that the vehicle in the tracking detection area image is not detected, but the license plate number of the vehicle is detected and/or recognized. The characteristic information of the license plate can be used as the characteristic information of the vehicle.

(3) If the vehicle area of the vehicle does not include license plate areas of any license plates, then it is determined that only the vehicle is detected, but the license plate of the vehicle is not detected and/or the license plate number of the license plate is not recognized. For example, in the area 10413 shown in FIG. 3, the vehicle area does not include any license plate areas, which indicates that only the vehicle in the tracking detection area image is detected, but the license plate number of the vehicle cannot be detected and identified.

In step S1043, the motion detection is performed on the vehicle and the license plate to determine a motion state of the vehicle and the license plate.

For example, the motion state of the vehicle and the license plate includes a stationary state and a moving state.

Optionally, the motion detection algorithm may be employed to perform the motion detection on the vehicle and the license plate. The motion detection algorithm includes the Lucas-kanade algorithm based on the optical flow, the Kalman filtering algorithm, and the like.

In step S1044, the parking event information is determined according to the motion state of the vehicle and the motion state of the license plate.

For example, if the motion state of the vehicle is the stationary state, then the parking event information of the vehicle is determined according to the tracking detection area where the vehicle is located. If the motion state of the license plate is the stationary state, then the parking event information of the vehicle identified by the license plate is determined according to the tracking detection area where the license plate is located. If the motion state of the vehicle is the moving state, then the vehicle is tracked to determine the parking event information of the vehicle. If the motion state of the license plate is the moving state, then the license plate is tracked to determine the parking event information of the vehicle identified by the license plate.

Optionally, the vehicle tracking algorithm may be employed to track the vehicle in the tracking detection area image. The license plate tracking algorithm may be employed to track the license plate in the tracking detection area image. The license plate tracking algorithm and the vehicle tracking algorithm include the high-speed tracking with kernelized correlation filters (KCF) algorithm, the Sum of Template And Pixel-wise LEarners (Staple) target tracking algorithm, or other types of image target tracking algorithms.

Figure 5:
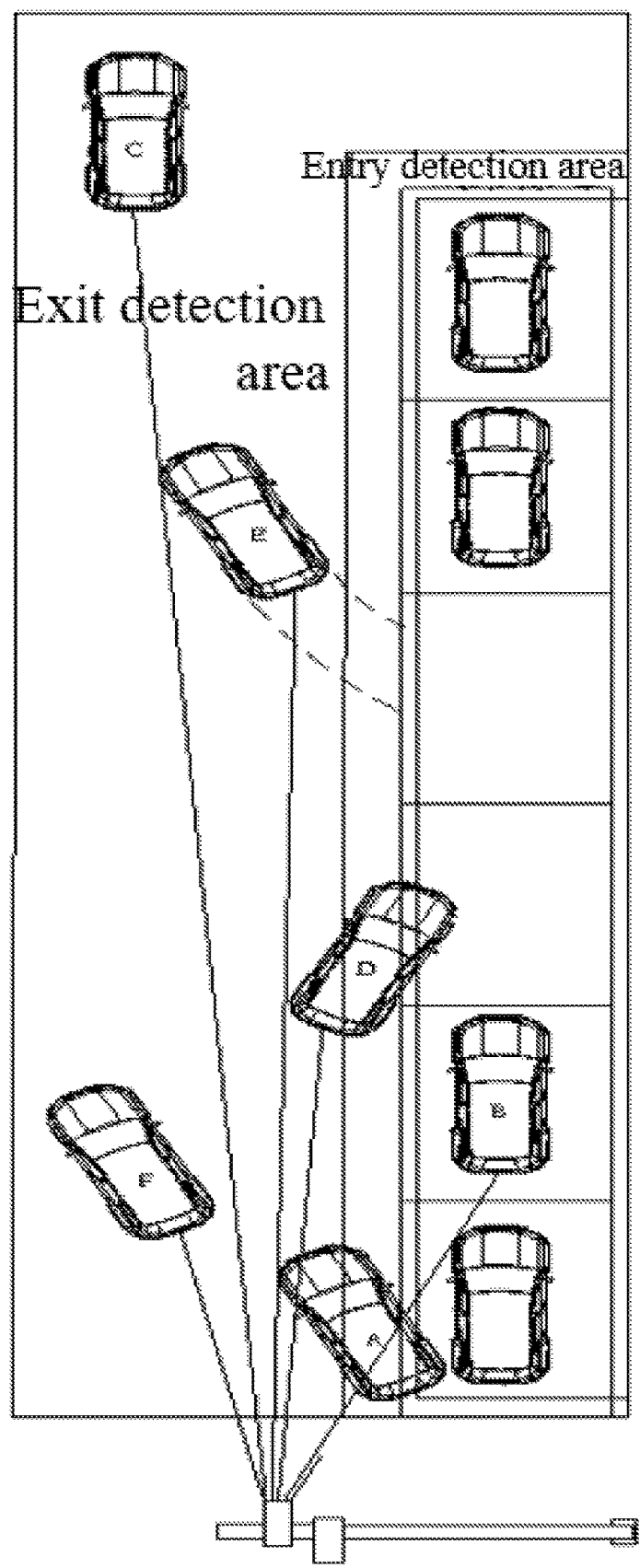
FIG. 5 is a schematic diagram showing a scenario of detecting, recognizing, and tracking the vehicle according to an embodiment of the present invention.

FIG. 5 is a schematic diagram showing a scenario of detecting, recognizing, and tracking the vehicle according to some embodiments of the present invention;

As shown in FIG. 5, the parking event information can be determined by the following process.

(1) If the motion state of the vehicle is the stationary state, then the parking event information of the vehicle is determined according to the tracking detection area where the vehicle is located. If the motion state of the license plate is the stationary state, then the parking event information of the vehicle identified by the license plate is determined according to the tracking detection area where the license plate is located.

In some embodiments, if the vehicle is located in the entry detection area (such as vehicle A shown in FIG. 5), then the time for which the vehicle stays in the entry parking area is calculated. Alternatively, if the license plate is located in the entry detection area, then the time for which the license plate stays in the entry parking area is calculated. If the time for which the vehicle or the license plate stays in the entry detection area exceeds the first threshold, then it is determined that the vehicle or the vehicle identified by the license plate is an illegal parking vehicle, and the type of the parking event is an illegal parking event. The first threshold can be set according to actual needs. For example, the first threshold may be set to be 3-5 minutes.

The above-mentioned processing methods can be used in the situations listed in step S1042. For example, in the case (1) of step S1042, when the vehicle is the stationary state, the license plate or the vehicle cannot be detected or identified temporarily if the license plate or the vehicle is blocked by persons or other objects. Therefore, if the license plate is detected or the vehicle is the stationary state, then the parking event information of the vehicle can be determined in the case (1) of step S1042.

In some embodiments, if the license plate is located in the parking space area (such as vehicle B shown in FIG. 5), and the license plate number of the license plate has been identified, then the on-the-spot vehicle information table is searched according to the license plate number. If the license plate number has not been recorded before, then it is determined that the vehicle identified by the license plate is an entering vehicle, and the entry parking event information of the vehicle identified by the license plate is determined. The entry parking event information may include the license plate number of the vehicle, the entry time of the vehicle, and the parking space where the vehicle is located.

If the vehicle is located in the parking space area and the license plate number of the vehicle is not recognized, then the on-the-spot vehicle information table is searched according to the characteristic information (e.g., color, model, etc.) of the vehicle. If the vehicle has not been recorded before, then it is determined that the vehicle is an unlicensed entering vehicle, and the entry parking event information of the vehicle identified by the license plate is determined. The entry parking event information may include characteristic information of the vehicle, the entry time of the vehicle, and the parking space where the vehicle is located.

In some cases, the vehicle is not captured and identified when moving to the parking space. Consequently, the parking event information of the vehicle cannot be recorded after the vehicle is parked in the parking space. Therefore, in some embodiments, the motion detection and identification may be performed on the vehicle parked in the parking space area in real time or periodically, additional information such as the model, color, entry time, license plate number and other parking event information of the vehicle is recorded by matching the identified license plate number of the vehicle with the on-the-spot vehicle information table.

In some embodiments, if a vehicle is located in the exit detection area (such as vehicle C shown in FIG. 5), then the time for which the vehicle stays in the exit parking area is calculated. Alternatively, if the license plate is located in the exit detection area, then the time for which the license plate of the vehicle stays in the exit parking area is calculated. If the time for which the vehicle or the license plate stays in the exit detection area exceeds the first threshold, then it is determined that the vehicle or the vehicle identified by the license plate is an illegal parking vehicle, and the type of the parking event is an illegal parking event. The determination of illegal parking events can assist in traffic management. The above-mentioned processing methods can be also used in the situations listed in step S1042.

(2) If the motion state of the vehicle is the moving state, then the vehicle is tracked to determine the parking event information of the vehicle. If the motion state of the license plate is the moving state, then the license plate is tracked to determine the parking event information of the vehicle identified by the license plate.

A tracking scheme corresponding to the situation determined in step S1042 may be employed to track the vehicle. For example, the tracking scheme can be achieved by the following method.

1) If a vehicle in the tracking detection area image is detected, and a license plate of the vehicle is detected and/or a license plate number of the license plate is recognized, then a vehicle tracking algorithm is configured to select the vehicle area as an initial target vehicle area for tracking, and a license plate tracking algorithm is configured to select the license plate area and the surrounding area of the license plate as an initial target license plate area for tracking.

In some embodiments, if a vehicle (such as vehicle D in FIG. 5) crosses the parking line (i.e., boundary 2 in FIG. 2) and enters the parking space (i.e., the target vehicle area and the target license plate area moves into the parking space in the parking space area) in the parking space area from the entry detection area, then the time for which the vehicle stays in the parking space is calculated. If the time for which the vehicle stays in the parking space exceeds the second threshold, then the tracking is stopped and the motion detection of the vehicle continues to be performed (since the tracking algorithm consumes a large number of computational resources. Therefore, when it is determined that the vehicle is parked in the parking space, the tracking can be stopped to save computational resources), this parking event is recorded as an entry parking event (i.e., the type of the parking event is an entry parking event), and the information of the entry parking event is determined and stored, namely, the license plate number of the vehicle, the entry time, and the parking space where the vehicle is located when the entry parking event occurs, are written into the on-the-spot vehicle information table. Also, the entry key point image of the vehicle, the entry key time-series image of the vehicle, and the entry tracking video of the vehicle are linked to the on-the-spot vehicle information table and stored. The second threshold can be set according to actual needs. For example, the second threshold may be set to be 20-30 seconds. If the vehicle does not enter the parking space area and exits from the entry detection area, then the tracking of the vehicle is stopped.

In some embodiments, if a vehicle (such as vehicle E shown in FIG. 5) enters the exit detection area from a parking space in the parking space area (i.e., the vehicle area and the license plate area enter the exit detection area from the parking space in the parking space area), then it is determined that the vehicle is an exiting vehicle, and the exit parking event information is determined. The exit parking event information includes a license plate number, an exit time of the vehicle, the parking space where the vehicle is located when the exit parking event occurs, an exit key point image, an exit key time-series image, and an exit tracking video.

In some embodiments, if the license plate of a vehicle (such as vehicle F in FIG. 5) is tracked in the exit detection area, and the license plate number of the license plate has been identified, then the on-the-spot vehicle information table is searched according to the license plate number. If the license plate number has been recorded before, namely, the vehicle identified by the license plate is an entering vehicle before, then it is determined that the vehicle identified by the license plate is an exiting vehicle and the exit parking event information of the vehicle is determined. The exit parking event information includes a license plate number, an exit time, and a parking space where the vehicle identified by the license plate is located. The exit time of the vehicle, the license plate number and other exit parking event information are additionally recorded by tracking and recognizing vehicles in the exit detection area and matching the identified license plate number with the on-the-spot vehicle information table, which can solve the problem of missing the exit parking event information of the vehicle due to a failure to capture and recognize the vehicle when the vehicle exits from the parking space.

2) If the vehicle in the tracking detection area is detected, but the license plate of the vehicle is not detected, the vehicle area is selected as the initial target vehicle area by a vehicle tracking algorithm for tracking.

In some embodiments, if the vehicle (such as vehicle D shown in FIG. 5) crosses the parking line (i.e., boundary 2 shown in FIG. 2) and enters the parking space (i.e., the parking space moved from the entry detection area into the parking space area) of the parking space area from the entry detection area, and a time for which the vehicle stays in the parking space exceeds the second threshold, then the tracking on the vehicle is stopped and the motion detection continues to be performed on the vehicle. The parking event of the vehicle is recorded as an entry parking event, and information of the entry parking event is determined and stored. Specifically, the entry time of the vehicle and the parking space where the vehicle is located when the entry parking event occurs, are written to the on-the-spot vehicle information table. Further, an entry key point image, an entry key time-series image, and an entry tracking video of the vehicle are linked to the on-the-spot vehicle information table and then are stored. If the vehicle does not enter the parking space area while exiting from the entry detection area, the tracking of the vehicle is stopped.

In some embodiments, if the vehicle (such as vehicle E shown in FIG. 5) enters the exit detection area from the parking space area (i.e., the target vehicle area enters the exit detection area from the parking space in the parking space area), it is determined that the vehicle is an exiting vehicle, and the exit parking event information is determined. The exit parking event information includes the exit time, the parking space where the vehicle is located when the exit parking event occurs, the exit key point image, the exit key time-series image, and the exit tracking video.

3) If the vehicle in the tracking detection area image is not detected, but the license plate of the vehicle is detected and/or the license plate number of the license plate is recognized, the license plate image and the surrounding area of the license plate image are selected as the initial target license plate area by a license plate tracking algorithm for tracking.

In some embodiments, if the license plate (such as the license plate of vehicle D shown in FIG. 5) crosses the parking line (i.e., boundary 2 shown in FIG. 2) and enters the parking space (i.e., the parking space moved from the target license plate area into the parking space area) of the parking space area from the entry detection area, and the time for which the vehicle stays in the parking space exceeds the second threshold, then the tracking of the vehicle is stopped and the motion detection continues to be performed on the vehicle. The vehicle identified by the license plate is recorded as an entering vehicle, and the parking event of the vehicle is recorded as an entry parking event (i.e., the type of the parking event is an entry parking event). The information of the parking event is determined and stored. Specifically, the license plate number, the entry time, and the parking space where the vehicle is located when the entry parking event occurs, are written to the on-the-spot vehicle information table; and the entry key point image, the entry key time-series image, and the entry tracking video are linked to the vehicle presence table and then are stored.

In some embodiments, if the license plate (such as the license plate of vehicle E shown in FIG. 5) enters the exit detection area from a parking space in the parking space area (i.e., the target license plate area enters the exit detection area from the parking space in the parking space area), it is determined that the vehicle identified by the license plate is an exiting vehicle, and the exit parking event information is determined. The exit parking event information includes the license plate number, the exit time, the parking space where the vehicle is located when the exit parking event occurs, the exit key point image, the exit key time-series image, and the exit tracking video.

In some embodiments, if the license plate (such as the license plate of vehicle F shown in FIG. 5) is tracked in the exit detection area, and the license plate number of the license plate has been recognized, then the on-the-spot vehicle information table is searched according to the license plate number. If the license plate number has been recorded before, i.e., the vehicle identified by the license plate is the entering vehicle, it is determined that the vehicle identified by the license plate is an exiting vehicle, and the exit parking event information of the vehicle identified by the license plate is determined. The exit parking event information includes the license plate number, the exit time, and the parking space where the vehicle is located when the exit parking event occurs. The exit parking event information, such as the exit time, the license plate number of the vehicle, and others, is additionally recorded by tracking and recognizing the license plate of the vehicle in the exit detection area, and matching the recognized license plate number with the on-the-spot vehicle information table. In this way, the problem of missing the exit parking event information of the vehicle caused by a failure to capture and recognize the vehicle in the course of exiting from the parking space can be avoided.

In some embodiments, in the course of tracking the target vehicle area, the latest image of the vehicle is captured periodically (or in real time), and the target vehicle area is updated to prevent a target vehicle from missing when tracking the target vehicle area for a long time. In the course of tracking the target license plate area, the latest license plate image of the vehicle and the image of the surrounding area of the license plate image are captured periodically (or in real time) to update the target license plate area to prevent a target license plate from missing when tracking the target license plate area for a long time. In addition to the area of the license plate image, the target vehicle area may further include a surrounding area of the license plate image, which can improve the accuracy of detecting the license plate.

Optionally, after the vehicle enters a parking space and stays for a time exceeding the first threshold, the vehicle goes to park in another parking space in the parking space area. In this case, the entry time of the vehicle is the time of entering the first parking space, and the final parking space of the vehicle is the last parking space.

In the foregoing embodiments, since the camera, especially the bullet camera, has the characteristics of stable visual angle and focal length, the camera can quickly, continuously and stably collect images. For example, when the field of view of the current 2-megapixel bullet camera mounted on a 6-meter monitoring pole covers 2-3 parking spaces, the clear and stable vehicle image and license plate image can be obtained, which has a high recognition rate, and can obtain a complete chain of evidence throughout the parking event. Therefore, in the present disclosure, based on the division of the images captured by the camera, the obtained image areas are simultaneously processed to realize the tracking and identification of the entering or exiting vehicles. In addition, when multiple concurrent parking events occur in several parking spaces monitored by a camera, the multiple parking events can be managed simultaneously according to the divided areas without considering the dispatch response time of the camera compared to the management method using dome cameras. Furthermore, in the present disclosure, the images captured by the cameras can be jointly processed to further improve the degree of confidence and accuracy. In summary, the technical solution of the present disclosure can improve the management efficiency of roadside parking events.

Figure 6:
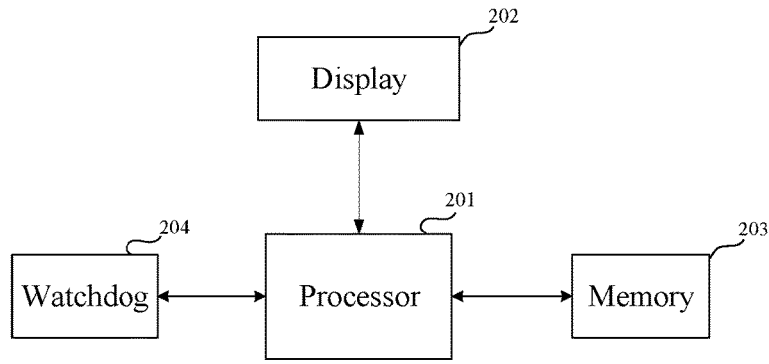
FIG. 6 is a schematic block diagram showing the configuration of the parking management device according to an embodiment of the present invention.

FIG. 6 is a schematic block diagram showing the configuration of the parking management device according to an embodiment of the present invention.

The parking management device is configured to execute the method provided in any one of the foregoing embodiments of the present disclosure. As shown in FIG. 6, the parking management device includes the processor 201 and the memory 203, and may further include the display 202 in some embodiments. In other embodiments, the parking management device may further include the watchdog (WD) 204. Specifically, the components of the device can be configured in the following manner.

The processor 201 is configured to receive the monitoring area image captured by the camera, divide the monitoring area image according to the image division rule of the camera to obtain a plurality of tracking detection areas in the monitoring area image, monitor at least one of a vehicle and a license plate in the monitoring area image, and determine parking event information according to a tracking detection area where the at least one of the vehicle and the license plate is located. The tracking detection area includes a parking space area, an entry detection area, and an exit detection area. The parking event information includes the license plate number of the vehicle, the type of the parking event, and the parking space where the vehicle is located when the parking event occurs.

The display 202 is configured to display an operation management interface, and the image division rule of the camera is preset through the operation management interface. For example, the operation management interface receives a first query instruction input by a user, wherein the first query instruction is an operation that the user selects to query the monitoring information of the camera. The operation management interface acquires a first monitoring area image captured by the camera according to the first query instruction, and displays the first monitoring area image. The first monitoring area image is the latest monitoring area image captured by the camera. The operation management interface receives the coordinates of the tracking detection area selected by the user in the first monitoring area image, wherein the coordinates of the tracking detection area are used as the image division rule of the camera.

The memory 203 is configured to store monitoring information of each camera. The monitoring information includes: the monitoring area image captured by the camera, divided images (including a roadside parking monitoring area, a parking space area, an entry detection area, an exit detection area and other tracking detection area images), the image division rule, information of a managed parking space, and parking event information occurring in the parking space. The parking event information includes the type of the parking event, the time at which the parking event occurs, the parking space where the vehicle is located when the parking event occurs, the parking time of the vehicle, the license plate number of the vehicle, the key point image, the key time-series image, the tracking video, and others.

The watchdog 204 is configured to monitor the working status of the processor 201 and upload information about the working status of the processor 201 to the background server. When the processor works abnormally, the watchdog 204 controls the processor 201 to cease operating or a manager controls the processor 201 to cease operating through the background server.

Optionally, the camera described in the present embodiment is a bullet camera.

In some embodiments, the processor 201 may periodically send a key point image, a key time-series image, and a tracking video of each parking event stored in the memory 203 to the server, so that the user can find the key point image and the key time-series image of each parking event by the operation management interface to inspect the parking event. The server can recognize and process the key time-series image and the tracking video to modify and supplement the parking event information (e.g., the license plate number and others) determined by the processor 201 of the parking management device. In this way, the recognition rate of license plates and management efficiency of parking events can be further improved by the parking management device.

In some embodiments, the parking management device can work according to the following process.

The processor 201 stores the monitoring area image, the key point image, the tracking video, and the key time-series image captured by the camera in the memory 203 via the input module.

The user can set the image division rule of the camera and query the monitoring information of the camera through the operation management interface on the display 202. When the operation management interface on the display 202 receives the first query instruction input by the user, i.e., when the user selects to query the monitoring information of a certain camera, the operation management interface displays the latest monitoring area image (the first monitoring area image) captured by the camera, the user can select (click) the coordinates (coordinates of the parking space area, the entry detection area, and the exit detection area) of the tracking monitoring area of the vehicle in the first monitoring area image as the image division rule of the camera and store the coordinates in the memory 203.

After the processor 201 subsequently receives the monitoring area image captured by the camera, the processor 201 divides the monitoring area image captured by each camera according to the image division rule of each camera to obtain the tracking detection areas in the monitoring area image, i.e., the parking space area, the entry detection area, and the exit detection area.

The processor 201 performs the target detection, motion detection, license plate recognition, target vehicle tracking, and target license plate tracking on the image of the tracking monitoring area of the vehicle to obtain the parking event information on the parking space.

When the user performs operations such as queries and inspections through the operation management interface to supplement the parking event information, the operation management interface can display information such as the monitoring area image, the key point image, the tracking video, the key time-series image, and others to assist users to inspect and supplement the parking event information.

For example, the specific process of the detection, identification, and tracking on the vehicle in the image performed by the processor 201 can refer to the specific implementation process of step S104 in the method embodiment provided by the present disclosure, which is not repeatedly described herein.

In the foregoing embodiment, based on the embodiment of the parking management method provided by the present disclosure, the above-mentioned method is implemented by using the parking management device, namely, the image division rule of the camera is set by operating via the software (the operation management interface). After that, the processor divides the images captured by the camera according to the image division rule, processes all obtained image areas at the same time, and detects, identifies, and tracks vehicles that enter and exit. In addition, when multiple concurrent parking events occur in several parking spaces monitored by the camera, the multiple parking events can be managed simultaneously according to the divided areas. Compared to the management method using dome cameras, this parking management device is not affected by the dispatch response time (similar to the response time of dome cameras) of the camera. Therefore, the method provided by the present disclosure can improve the management efficiency of roadside parking events.

Figure 7:
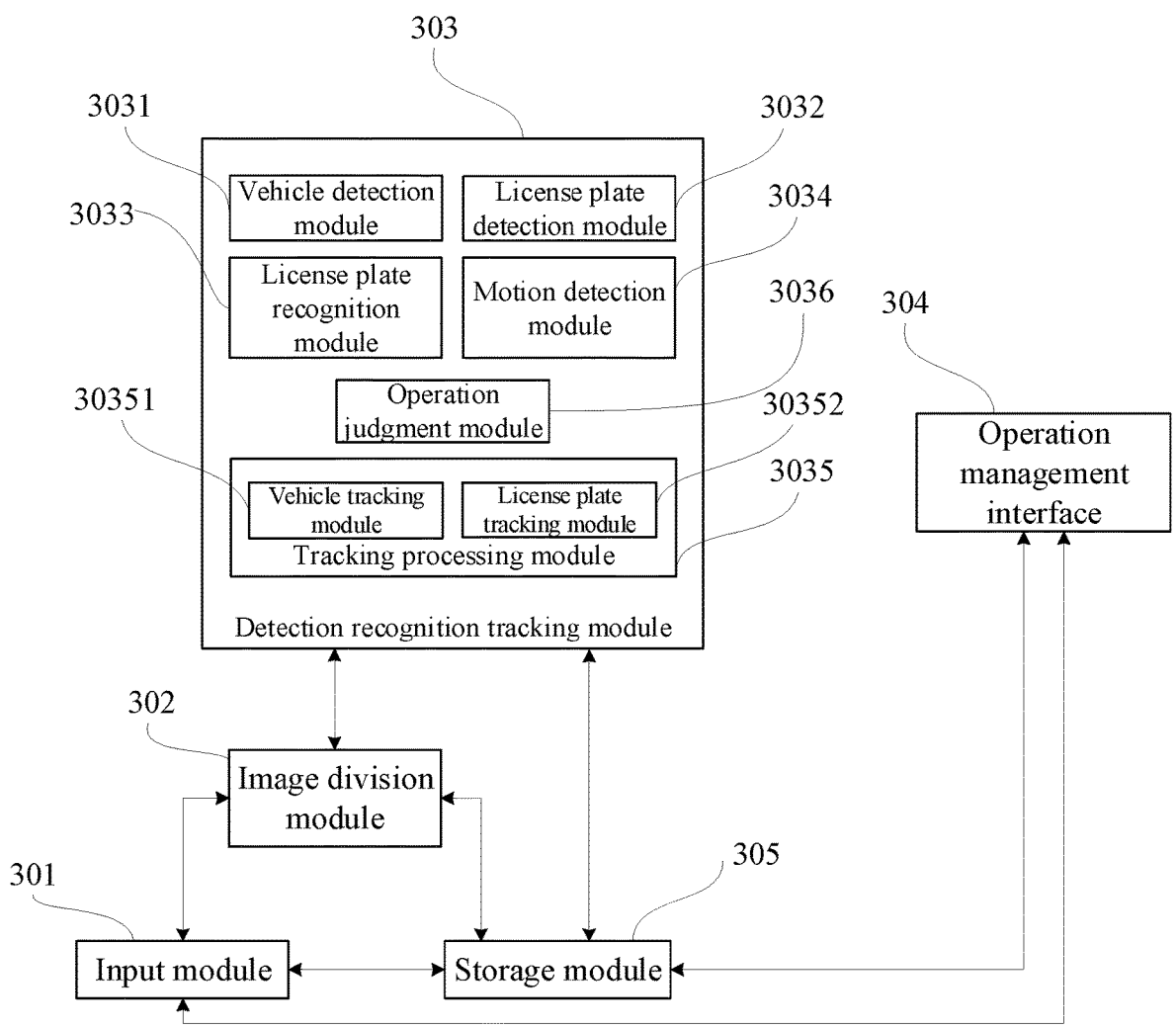
FIG. 7 is a schematic block diagram showing the configuration of another parking management device according to an embodiment of the present invention.

FIG. 7 is a schematic block diagram showing the configuration of another parking management device according to an embodiment of the present invention.

The parking management device can be configured to execute the method in any one of the foregoing embodiments of the present disclosure. As shown in FIG. 7, the parking management device includes the input module 301, the image division module 302, and the detection recognition tracking module 303. In some embodiments, the parking management device may further include the operation management interface 304. In other embodiments, the parking management device may further include the storage module 305. For example, each module in the parking management device can work according to the following process.

The input module 301 is configured to receive a monitoring area image captured by a camera.

The image division module 302 is configured to divide the monitoring area image captured by the camera according to the image division rule of the camera to obtain a plurality of tracking detection areas in the monitoring area image. The tracking detection area includes a parking space area, an entry detection area, and an exit detection area.

The detection recognition tracking module 303 is configured to monitor at least one of a vehicle and a license plate in the monitoring area image, and determine parking event information according to a tracking detection area where the at least one of the vehicle and the license plate is located.

In some embodiments, the detection recognition tracking module 303 may include the vehicle detection module 3031, the license plate detection module 3032, the license plate recognition module 3033, the motion detection module 3034, the tracking processing module 3035, and the operation judgment module 3036.

The license plate detection module 3032 is configured to perform license plate detection on the tracking detection area by using a license plate detection algorithm to determine the license plate in the tracking detection area. The license plate recognition module 3033 is configured to recognize the license plate by using a license plate recognition algorithm to determine the license plate number of the license plate. The operation judgment module 3036 is configured to determine whether the license plate belongs to the vehicle. The motion detection module 3034 is configured to perform motion detection on the vehicle and the license plate by using a motion detection algorithm to determine a motion state of the vehicle and the license plate. The motion state of the target vehicle and the target license plate includes a stationary state and a moving state.

The tracking processing module 3035 is configured to determine parking event information according to the motion state of the vehicle and the license plate. For example, if the motion state of the vehicle or license plate is the stationary state, the parking event information is determined according to the tracking detection area where the vehicle or the license plate is located. If the motion state of the vehicle or the license plate is the moving state, the vehicle is tracked and/or the license plate is tracked to determine the parking event information.

In some embodiments, the tracking processing module 3035 may include the vehicle tracking module 30351 and the license plate tracking module 30352. The vehicle tracking module 30351 is configured to track the vehicle by using the vehicle tracking algorithm to determine the parking event information. The license plate tracking module 30352 is configured to track the license plate by using the license plate tracking algorithm to determine the parking event information.

The operation management interface 304 is configured to display the monitoring area image captured by the camera, the tracking detection area, and the parking event information, and is further configured to receive the coordinates of the parking space area, the entry detection area, and the exit detection area that are input when the user selects the tracking detection area and use the coordinates as the image division rule of the camera, so as to preset the image division rule of the camera. For example, the image division rule can be preset according to the following method.

The operation management interface 304 receives a first query instruction input by a user. The first query instruction is an operation that the user selects to query the monitoring information of the camera.

The operation management interface 304 obtains a first monitoring area image captured by the camera according to the first query instruction, and displays the first monitoring area image. The first monitoring area image is the latest monitoring area image captured by the camera.

The operation management interface 304 receives the coordinates of the tracking detection area selected by the user in the first monitoring area image. The coordinates of the tracking detection area are used as the image division rule of the camera.

The storage module 305 is configured to store the monitoring information of each camera. The monitoring information includes: the monitoring area image captured by the camera, divided images (including a roadside parking monitoring area, a parking space area, an entry detection area, an exit detection area and other tracking detection area images), the image division rule, information of the managed parking space, and parking event information occurring in the parking space. The parking event information includes the type of the parking event, the time at which the parking event occurs, the parking space where the vehicle is located when the parking event occurs, the parking time of the vehicle, the license plate number of the vehicle, the key point image, the key time-series image, and the tracking video.

In some embodiments, the working process of the parking management device is as follows.

The monitoring area image, the key point image, the tracking video, and the key time-series image captured by the camera are stored in the storage module 305 via the input module 301.

The user can select and set the image division rule of the camera and query monitoring information of the camera through the operation management interface 304. When the operation management interface 304 receives the first query instruction input by the user, i.e., when the user selects to query the monitoring information of the camera, the operation management interface 304 displays the latest monitoring area image (the first monitoring area image) captured by the camera. The user can select (click) the coordinates (coordinates of the parking space area, the entry detection area, and the exit detection area) of the tracking monitoring area of the vehicle in the first monitoring area image as the image division rule of the camera and store the coordinates in the storage module 305.

When the input module 301 subsequently receives the monitoring area images captured by the camera, the image division module 302 divides the monitoring area images captured by the camera according to the image division rule of each camera to obtain images of the tracking monitoring area of the vehicle including the parking space area, the entry detection area, and the exit detection area and write the images of the tracking monitoring area of the vehicle into the storage module 303, and send the images of the tracking monitoring area of the vehicle to the detection recognition tracking module 303 for processing.

After the detection recognition tracking module 303 receives the tracking detection area, the vehicle detection module 3031 is activated to perform vehicle detection on the tracking detection area by using the vehicle detection algorithm to determine the vehicle in the tracking detection area, the license plate detection module 3032 is activated to perform license plate detection in the tracking detection area by using the license plate detection algorithm to determine the license plate in the tracking detection area, and the license plate recognition module 3033 is activated to recognize the license plate by using the license plate recognition algorithm to determine the license plate number of the license plate.

After the vehicle and the license plate in the tracking detection area are detected, the operation judgment module 3036 and the motion detection module 3034 are respectively activated. The operation judgment module 3036 determines whether the license plate belongs to the vehicle according to the positional relationship between the vehicle and the license plate. The motion detection module 3034 is activated to perform motion detection on the vehicle and the license plate by using the motion detection algorithm to determine the motion state of the vehicle and the license plate.

If the motion state of the vehicle or the license plate is the stationary state, the tracking processing module 3035 determines parking event information according to the tracking detection area where the vehicle or the license plate is located. For example, if the vehicle is located in the entry detection area or the exit detection area, the tracking processing module 3035 calculates the time for which the vehicle stays in the entry parking area. Alternatively, if the license plate is located in the entry detection area or the exit detection area, the tracking processing module 3035 calculates the time for which the vehicle identified by the license plate stays in the entry parking area. If the time for which the vehicle or the vehicle identified by the license plate stays in the entry detection area exceeds the first threshold, it is determined that the vehicle or the vehicle identified by the license plate is an illegal parking vehicle. If the license plate is located in the parking space area and the license plate has been recognized by the license plate recognition module 3033, the tracking processing module 3035 searches the on-the-spot vehicle information table according to the license plate number. If the license plate number has not been recorded before, then it is determined that the vehicle identified by the license plate is an entering vehicle, and the entry parking event information of the vehicle is determined.

If the motion state of the vehicle and/or the license plate is the moving state, then the tracking processing module 3035 tracks the vehicle and/or tracks the license plate. For example, if the vehicle in the tracking detection area is detected by the vehicle detection module 3031, and the license plate of the vehicle is detected by the license plate detection module 3032 and/or the license plate number of the license plate is recognized by the license plate recognition module 3033, then the tracking processing module 3035 activates the vehicle tracking module 30351 to track the vehicle, and activates the license plate tracking module 30352 to track the license plate.

If the vehicle in the tracking detection area is detected by the vehicle detection module 3031 but the license plate of the vehicle is not detected by the license plate detection module 3032, then the tracking processing module 3035 activates the vehicle tracking module 30351 to track the vehicle.

If the vehicle in the tracking detection area image is not detected by the vehicle detection module 3031 but the license plate of the vehicle is detected by the license plate detection module 3032 and/or the license plate number of the license plate is recognized by the license plate recognition module 3033, then the tracking processing module 3035 activates the license plate tracking module 30352 to track the license plate.

If the tracked vehicle crosses the parking line and enters the parking space in the parking space area from the entry detection area, then the tracking processing module 3035 calculates the time for which the vehicle stays in the parking space. If the time for which the vehicle stays in the parking space exceeds the second threshold, then it is determined that the parking event is an entry parking event, and the entry parking event information is determined. If the time for which the vehicle stays in the parking space exceeds the second threshold, then the tracking processing module 3035 stops tracking the vehicle, and the motion detection module 3034 continues to perform motion detection on the vehicle. If the time for which the vehicle identified by the license plate stays in the parking space exceeds the second threshold, the tracking processing module 3035 stops tracking the license plate, and the motion detection module 3034 continues to perform motion detection on the license plate.

If it is tracked that the vehicle enters the exit detection area from the parking space in the parking space area, then it is determined that the vehicle is an exiting vehicle, and the exit parking event information is determined.

If the license plate of the vehicle is tracked by the license plate tracking module 30352 in the exit detection area and the license plate number of the license plate is recognized by the license plate recognition module 3033, then the tracking processing module 3035 searches the on-the-spot vehicle information table. If the license plate number has been recorded before, then it is determined that the vehicle identified by the license plate is an exiting vehicle, and the parking event information of the vehicle identified by the license plate is determined.

When the user performs operations such as queries and inspections through the operation management interface 304 to supplement the parking event information, the operation management interface 304 can display parking event information such as key point images, key time-series images, and tracking videos according to the operation of the user, so as to assist the user in inspecting and supplementing parking event information.

In some embodiments, the specific process of the parking management method implemented by the parking management device in any of the foregoing embodiments can refer to the specific process in the embodiments of the parking management method, which is not repeatedly described herein.

In the foregoing embodiment, based on the parking management method in the embodiments provided by the present disclosure, the above-mentioned method is achieved by using the parking management device. Specifically, the users set the image division rule of the camera by operating the software (the operation management interface), and then the processor divides the images captured by the camera according to the image division rule, processes each obtained image area at the same time, and performs tracking and identification on the entering vehicles and the exiting vehicles. When multiple concurrent parking events occur in several parking spaces monitored by one camera, the multiple parking events can be managed simultaneously according to the divided areas without considering the dispatch response time of the camera compared to the management method using dome cameras. Therefore, the method provided by the embodiment of the present invention can improve the management efficiency of roadside parking events.

Figure 8:
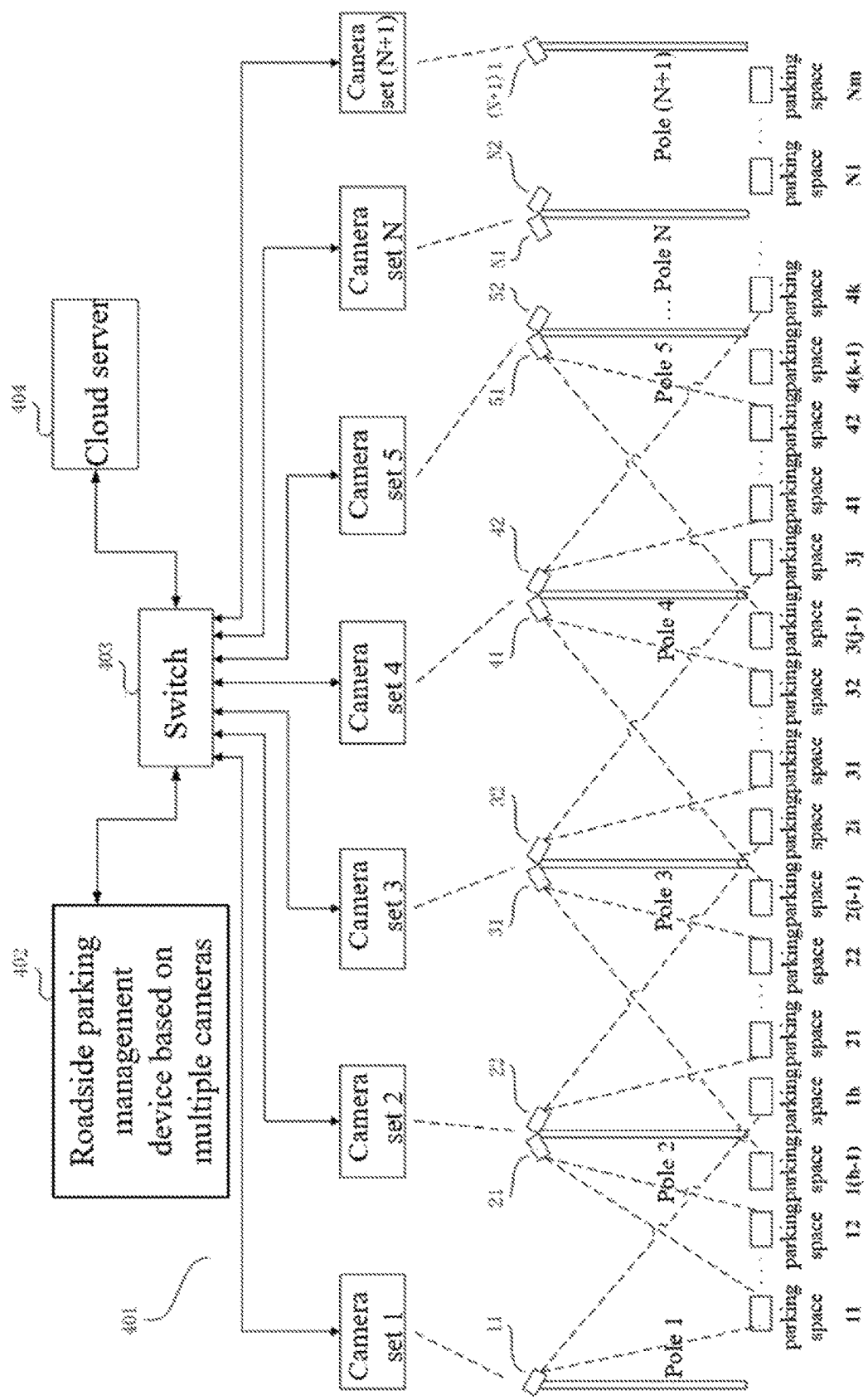
FIG. 8 is a schematic block diagram showing the configuration of the parking management system according to an embodiment of the present invention.

FIG. 8 is a schematic block diagram showing the configuration of the parking management system according to an embodiment of the present invention.

As shown in FIG. 8, the parking management system includes the camera group 401, and the parking management device 402 shown in FIG. 6 or FIG. 7.

In some embodiments, the parking management system may further include the switch 403 and the cloud server 404. The camera group 401, the parking management device 402, and the cloud server 404 can all communicate via the switch.

The camera group 401 includes N camera sets, wherein the value of N is not less than 2, and the specific value of N can be determined according to the actual situation. Each camera set includes at least one camera array, for example, camera set 1 includes camera array 11, camera set 2 includes camera array 21 and camera array 22, . . . , camera set N includes camera array N1 and camera array N2, and camera set (N+1) includes camera array (N+1) 1. Each camera array includes at least one camera, and the specific number can be determined according to the actual situation. The camera is preferably a bullet camera.

Each camera set is mounted on a pole in the roadside parking lot, and one camera group is mounted on one pole. The camera set mounted on the first pole and the camera set mounted on the last pole each include a camera array, and the camera sets mounted on the other poles each include two camera arrays. In this way, the parking space between every two poles can be monitored and managed from both sides by the two camera arrays on the two poles. Each camera array manages a certain number of parking spaces. In some embodiments, each camera in the camera array is configured to manage 2-5 parking spaces. After the camera set is mounted on the pole, the camera is directed at the respective managed parking spaces, the parameters such as the focal length and installation angle of each camera are set, and the roadside parking monitoring area and parking space managed by each camera are determined to obtain the monitoring information.

In some embodiments, the components of the parking management system can be configured in the following manner.

The camera group 401 is configured to acquire the monitoring area image in the parking spaces managed by the camera group 401.

The parking management device 402 is configured to perform image division on the monitoring area image according to the image division rule, and perform detection, recognition, and tracking processing on the monitoring area image to determine the parking event information of the parking spaces managed by the camera group 401.

The switch 403 is configured to connect the camera group 401, the parking management device 402 based on multiple cameras, and the cloud server 404 to perform communications.

The cloud server 404 is configured to manage the parking event information. For example, the cloud server 404 stores the parking event information determined by the parking management device 402, and performs detection, recognition, and tracking processing on the key time-series images, tracking videos, and other data in batches to supplement information missing from the parking event.

In some embodiments, the working process of the parking management system can be performed according to the following process.

The monitoring area image in each parking space is obtained by the camera group 401 and then transmitted to the parking management device 402 via the switch 403. The parking management device 402 performs image division on the monitoring area image according to the image division rule, and performs detection, recognition, and tracking processing on the monitoring area image to determine the parking event information on the parking spaces managed by the camera group 401. The parking management device 402 uploads the determined parking event information to the cloud server 404 via the switch. The cloud server 404 stores the parking event information, and performs detection, recognition, and tracking processing on data such as key time-series images and tracking videos in batches to supplement information missing from the parking event.

It should be noted that, in the course of acquiring the monitoring area image via the camera group 401, a camera sometimes fails to capture the monitoring area image of the vehicle that enters or exits from the parking space (for example, a camera misses the capturing time). If the vehicle enters an area managed by another camera (such as other cameras in this camera set and cameras in other camera sets), and is captured by another camera (for example, the vehicle appears in the roadside parking monitoring area image captured by another camera), and another camera uploads the roadside parking monitoring area image to the parking management device 402, then the parking management device 402 can perform image division, detection and recognition processing on the roadside parking monitoring area image to supplement the parking event information on the original parking space of the vehicle.

For example, as shown in FIG. 8, when a vehicle originally parked in the parking space 3j exits from the parking space, the camera configured to manage the parking space in the camera array 32 does not capture an image of the vehicle exiting from the parking space. When the vehicle appears in an exit detection area managed by a camera in the camera array 22, the camera in the camera array 22 sends the captured image to the parking management device 402 via the switch 403. The parking management device 402 can perform image division, detection and recognition processing on the monitoring area image to supplement the exit parking event information when the vehicle exits from the parking space 3j.

In the foregoing embodiment, the system uses a plurality of camera sets consisting of camera arrays to form a camera group. After the camera arrays are mounted, the parking space between every two poles is monitored in real time by the first camera array and the last camera array to improve the capturing efficiency. In addition, based on the multiple cameras, the parking management device 402 simultaneously performs the detection and the recognition processing on the monitoring area images captured by the cameras between respective poles, which can improve the efficiency of determining the roadside parking information and the completeness thereof, thereby improving the overall management efficiency of roadside parking.

In some embodiments, a computer-readable storage medium is provided, wherein a computer program is stored in the computer-readable storage medium, and the program is executed by a processor to achieve the roadside parking management method based on the multiple cameras in any one of the foregoing embodiments. Specifically, the computer-readable storage medium is a non-transitory computer-readable storage medium.

Hereto, the roadside parking management method, device, and system based on the multiple cameras, and the computer-readable storage medium of the present disclosure have been described in detail. In order to avoid obscuring the concept of the present disclosure, some details known in the prior art are not described. Based on the above descriptions, those skilled in the art can fully understand the implementation method of the technical solutions disclosed herein.

The method and system of the present disclosure may be implemented in many ways. For example, the method and system of the present disclosure may be implemented by software, hardware, firmware or any combination of software, hardware, and firmware. The above-mentioned sequential order of the steps of the method is only intended to facilitate the description, and the steps of the method of the present disclosure are not limited to the sequential order specifically described above unless otherwise specifically stated. Further, in some embodiments, the present disclosure can also be implemented as programs recorded in a recording medium, and these programs include machine-readable instructions that are configured to achieve the method of the present disclosure. Therefore, the present disclosure further includes the recording medium configured to store these programs that are configured to achieve the method of the present disclosure.

Although some specific embodiments of the present disclosure have been described in detail with reference to the illustrative example, those skilled in the art should understand that the foregoing embodiments are only intended to facilitate the description rather than limiting the scope of the present disclosure. Those skilled in the art should understand that the foregoing embodiments can be modified without departing from the scope and spirit of the present disclosure. The scope of the disclosure is defined by the appended claims.

What is claimed is:

1. A parking management method, comprising:
   receiving a monitoring area image, wherein the monitoring area image is captured by a camera;
   dividing the monitoring area image to obtain a plurality of tracking detection areas in the monitoring area image; wherein the plurality of tracking detection areas comprise a parking space area, an entry detection area, and an exit detection area;
   the entry detection area comprises an area adjacent to a boundary of the parking space area;
   the exit detection area comprises an area outside the parking space area; and
   monitoring a vehicle and a license plate in the plurality of tracking detection areas to determine parking event information; wherein the parking event information comprises a license plate number of the vehicle, a type of a parking event, and a parking space, and the vehicle is located in the parking space, wherein, the step of monitoring the vehicle and the license plate in the plurality of tracking detection areas to determine the parking event information comprises:

performing vehicle detection in the plurality of tracking detection areas to determine the vehicle in each tracking detection area of the plurality of tracking detection areas;

performing license plate detection in the plurality of tracking detection areas to determine the license plate in the each tracking detection area;

recognizing the license plate to determine the license plate number of the license plate;

performing motion detection on the vehicle and the license plate to determine a motion state of the vehicle and a motion state of the license plate, wherein the motion state of the vehicle and the motion state of the license plate each comprise a stationary state and a moving state; and determining the parking event information of the vehicle according to the motion state of the vehicle; and determining the parking event information of the vehicle identified by the license plate according to the motion state of the license plate, the method further comprising:

acquiring a positional relationship between the license plate and the vehicle;

when a license plate area of the license plate is located in a vehicle area of the vehicle, determining a first result of the license plate detection and the vehicle detection, wherein the first result indicates that both the vehicle and the license plate of the vehicle are detected and the license plate number of the license plate is recognized;

when the license plate area of the license plate is not located in the vehicle area of the vehicle, determining a second result of the license plate detection and the vehicle detection, wherein the second result indicates that only the license plate is detected and the license plate number of the license plate is recognized, and the vehicle identified by the license plate is not detected; and when the vehicle area of the vehicle does not contain the license plate area of the license plate, determining a third result of the license plate detection and the vehicle detection, wherein the third result indicates that only the vehicle is detected and the license plate of the vehicle is not detected, wherein, the step of tracking the vehicle or the license plate comprises:

when the vehicle in the tracking detection area is detected, and the license plate of the vehicle is detected or the license plate number is recognized, selecting the vehicle area as an initial target vehicle area for tracking, and selecting the license plate area and a surrounding area of the license plate as an initial target license plate area for tracking;

when the vehicle in the tracking detection area is detected and the license plate of the vehicle is not detected, selecting the vehicle area as the initial target vehicle area for tracking; and when the vehicle in the tracking detection area is not detected and the license plate of the vehicle is detected or the license plate number is recognized, selecting a license plate image of the license plate and a surrounding area of the license plate image as the initial target license plate area for tracking, wherein, the step of tracking the vehicle and the license plate to determine the parking event information comprises:

when the vehicle crosses a parking line and enters the parking space in the parking space area from the entry detection area, calculating a second time, wherein the vehicle stays in the parking space for the second time;

when the license plate crosses the parking line and enters the parking space in the parking space area from the entry detection area, calculating a third time, wherein the license plate stays in the parking space for the third time;

when the second time exceeds a second threshold, determining that the vehicle is an entering vehicle and the parking event of the vehicle is an entry parking event, determining entry parking event information, and recording the entry parking event information in an on-the-spot vehicle information table;

when the third time exceeds the second threshold, determining that the vehicle identified by the license plate is the entering vehicle, and the parking event of the vehicle identified by the license plate is the entry parking event and determining the entry parking event information, and recording the entry parking event information in the on-the-spot vehicle information table; and the entry parking event information comprises the license plate number, an entry time, the parking space, an entry key point image, an entry key time-series image, and an entry tracking video, wherein the vehicle is located in the parking space when the entry parking event occurs;

when the license plate is tracked in the exit detection area and the license plate number of the license plate is recognized, according to the license plate number, searching the on-the-spot vehicle information table to determine whether the license plate number has been recorded in the on-the-spot vehicle information table; and when the license plate number has been recorded in the on-the-spot vehicle information table before, determining that the vehicle identified by the license plate is an exiting vehicle, and determining exit parking event information of the vehicle identified by the license plate, wherein the exit parking event information comprises the license plate number, an exit time, and the parking space, wherein the vehicle identified by the license plate is located in the parking space.

2. The parking management method according to claim 1, wherein, the step of determining the parking event information of the vehicle according to a motion state of the vehicle and determining the parking event information of the vehicle identified by the license plate according to a motion state of the license plate comprises:

when the motion state of the vehicle is a stationary state, determining the parking event information of the vehicle according to a tracking detection area of the plurality of tracking detection areas, wherein the vehicle is located in the tracking detection area;

when the motion state of the license plate is the stationary state, determining the parking event information of the vehicle identified by the license plate according to the tracking detection area, wherein the license plate is located in the tracking detection area;

when the motion state of the vehicle is a moving state, tracking the vehicle to determine the parking event information of the vehicle; and when the motion state of the license plate is the moving state, tracking the license plate to determine the parking event information of the vehicle identified by the license plate.

3. The parking management method according to claim 2, wherein, the step of determining the parking event information of the vehicle identified by the license plate according to the tracking detection area, wherein the license plate is located in the tracking detection area, comprises:

when the license plate is located in the parking space area and the license plate number of the license plate is recognized, according to the license plate number, searching an on-the-spot vehicle information table to determine whether the license plate number has been recorded in the on-the-spot vehicle information table;

when the license plate number is not recorded in the on-the-spot vehicle information table, determining that the vehicle identified by the license plate is an entering vehicle, and determining and recording entry parking event information of the vehicle identified by the license plate, wherein the entry parking event information of the vehicle identified by the license plate comprises the license plate number of the vehicle, an entry time of the vehicle, and the parking space;

when the license plate is located in the entry detection area or the exit detection area, calculating a first time, wherein the license plate stays in the entry parking area or the exit parking area for the first time; and when the first time exceeds a first threshold, determining that the vehicle identified by the license plate is an illegal vehicle, and determining that the parking event of the vehicle identified by the license plate is an illegal parking event.

4. A parking management device, comprising:

a processor, configured to receive a monitoring area image captured by a camera, divide the monitoring area image to obtain a plurality of tracking detection areas in the monitoring area image, and perform vehicle detection and license plate detection in the plurality of tracking detection areas to determine parking event information; and a memory, configured to store the monitoring area image and the parking event information, wherein, the processor is further configured to:

perform the vehicle detection in each tracking detection area of the plurality of tracking detection areas to determine a vehicle in the each tracking detection area, perform the license plate detection in the each tracking detection area to determine a license plate in the each tracking detection area, recognize the license plate to determine a license plate number of the license plate, perform motion detection on the vehicle and the license plate to determine a motion state of the vehicle and a motion state of the license plate, wherein the motion state of the vehicle and the motion state of the license plate each comprise a stationary state and a moving state, and determine the parking event information of the vehicle and the license plate according to the motion state of the vehicle and the motion state of the license plate, wherein, the processor is further configured to:

acquire a positional relationship between the license plate and the vehicle, determine a first result of the license plate detection and the vehicle detection when a license plate area of the license plate is located in a vehicle area of the vehicle, wherein the first result indicates that both the vehicle and the license plate of the vehicle and the license plate number of the license plate are/is detected, determine a second result of the license plate detection and the vehicle detection when the license plate area of the license plate is not located in the vehicle area of the vehicle, wherein the second result indicates that only the license plate and the license plate number of the license plate are/is detected, and the vehicle identified by the license plate is not detected, and determine a third result of the license plate detection and the vehicle detection when the vehicle area of the vehicle does not contain the license plate area of the license plate, wherein the third result indicates that only the vehicle is detected, and the license plate of the vehicle is not detected, wherein, the processor is further configured to:

search, when the license plate is located in the parking space area and the license plate number of the license plate is recognized, an on-the-spot vehicle information table to determine whether the license plate number has been recorded in the on-the-spot vehicle information table according to the license plate number, determine, when the license plate number is not recorded in the on-the-spot vehicle information table, that the vehicle identified by the license plate is an entering vehicle, and determine and record entry parking event information of the vehicle identified by the license plate, wherein the entry parking event information of the vehicle identified by the license plate comprises the license plate number of the vehicle, an entry time of the vehicle, and a parking space, wherein the vehicle is located in the parking space, calculate, when the license plate is located in an entry detection area or an exit detection area, a first time, wherein the license plate stays in an entry parking area or an exit parking area for the first time, and determine, when the first time exceeds a first threshold, that the vehicle identified by the license plate is an illegal vehicle and a parking event of the vehicle identified by the license plate is an illegal parking event, wherein, the processor is further configured to:

calculate, when the vehicle crosses a parking line and enters the parking space in the parking space area from the entry detection area, a second time, wherein the vehicle stays in the parking space for the second time, calculate, when the license plate crosses the parking line and enters the parking space in the parking space area from the entry detection area, a third time, wherein the license plate stays in the parking space for the third time, determine, when the second time exceeds a second threshold, that the vehicle is entering vehicle and the parking event of the vehicle is an entry parking event, determine and record the entry parking event information in the on-the-spot vehicle information table, and determine, when the third time exceeds the second threshold, that the vehicle identified by the license plate is the entering vehicle and the parking event of the vehicle identified by the license plate is the entry parking event, determine the entry parking event information and record the entry parking event information in the on-the-spot vehicle information table; wherein the entry parking event information comprises the license plate number, the entry time, the parking space, an entry key point image, an entry key time-series image, and an entry tracking video, and the vehicle is located in the parking space when the entry parking event occurs; and when the vehicle enters the exit detection area from the parking space in the parking space area, the processor determines that the vehicle is an exiting vehicle, and determines exit parking event information of the vehicle; when the license plate enters the exit detection area from the parking space in the parking space area, the processor determines that the vehicle identified by the license plate is the exiting vehicle, and determines the exit parking event information of the vehicle identified by the license plate; wherein the exit parking event information comprises the license plate number, an exit time, the parking space, an exit key point image, an exit key time-series image, and an exit tracking video, wherein the vehicle is located in the parking space when an exit parking event occurs.

5. The parking management device according to claim 4, further comprising:

a display, configured to display an operation management interface; and the operation management interface is configured to receive a first query instruction input by a user; the first query instruction is an operation, wherein the user selects the operation to query monitoring information of the camera; the operation management interface is configured to acquire the monitoring area image captured by the camera according to the first query instruction, and display the monitoring area image; the operation management interface is configured to receive coordinates of a tracking detection area of the plurality of tracking detection areas, wherein the tracking detection area is selected by the user in the monitoring area image; the monitoring area image is divided according to the coordinates of the plurality of tracking detection areas.

6. A parking management device, comprising:

an input module, configured to receive a monitoring area image captured by a camera;

an image division module, configured to divide the monitoring area image to obtain a plurality of tracking detection areas in the monitoring area image; and a detection recognition tracking module, configured to monitor a vehicle and a license plate in the plurality of tracking detection areas to determine parking event information;

wherein the detection recognition tracking module comprises:

a vehicle detection module, configured to perform vehicle detection on the plurality of tracking detection areas by using a vehicle detection algorithm to determine the vehicle in the plurality of tracking detection areas;

a license plate detection module, configured to perform license plate detection on the plurality of tracking detection areas by using a license plate detection algorithm to determine the license plate in the plurality of tracking detection areas;

a license plate recognition module, configured to recognize the license plate by using a license plate recognition algorithm to determine a license plate number of the license plate;

a motion detection module, configured to perform motion detection on the vehicle and the license plate by using a motion detection algorithm to determine a motion state of the vehicle and a motion state of the license plate, wherein the motion state of the target vehicle and the motion state of the target license plate each comprise a stationary state and a moving state; and a tracking processing module, configured to determine the parking event information of the vehicle according to the motion state of the vehicle and the motion state of the license plate, wherein, when the vehicle in the plurality of tracking detection areas is detected by the vehicle detection module, and the license plate of the vehicle is detected by the license plate detection module or the license plate number is recognized by the license plate recognition module, the tracking processing module activates a vehicle tracking module to select a vehicle area of the vehicle as an initial target vehicle area for tracking, and activates a license plate tracking module to select a license plate area of the license plate and a surrounding area of the license plate as an initial target license plate area for tracking;

when the vehicle in the plurality of tracking detection areas is detected by the vehicle detection module, and the license plate of the vehicle is not detected by the license plate detection module, the tracking processing module activates the vehicle tracking module to select the vehicle area as the initial target vehicle area for tracking; and when the vehicle in the plurality of tracking detection areas is not detected by the vehicle detection module, and the license plate of the vehicle is detected by the license plate detection module or the license plate number is recognized by the license plate recognition module, the tracking processing module activates the license plate tracking module to select a license plate image of the license plate and a surrounding area of the license plate image as the initial target license plate area for tracking, wherein, when the vehicle crosses a parking line and enters a parking space in a parking space area from an entry detection area, the tracking processing module calculates a second time, wherein the vehicle stays in the parking space for the second time;

when the license plate crosses the parking line and enters the parking space in the parking space area from the entry detection area, the tracking processing module calculates a third time, wherein the license plate stays in the parking space for the third time;

when the second time exceeds a second threshold, the tracking processing module determines that the vehicle is an entering vehicle and a parking event of the vehicle is an entry parking event, determines entry parking event information, and records the entry parking event information in an on-the-spot vehicle information table;

when the third time exceeds the second threshold, the tracking processing module determines that the vehicle identified by the license plate is the entering vehicle and the parking event of the vehicle identified by the license plate is the entry parking event, determines the entry parking event information and records the entry parking event information in the on-the-spot vehicle information table; wherein the entry parking event information comprises the license plate number, an entry time, the parking space, an entry key point image, an entry key time-series image, and an entry tracking video, wherein the vehicle is located in the parking space when the entry parking event occurs:

when the vehicle enters an exit detection area from the parking space in the parking space area, the tracking processing module determines that the vehicle is an exiting vehicle, and determines exit parking event information of the vehicle; and when the license plate enters the exit detection area from the parking space in the parking space area, the tracking processing module determines that the vehicle identified by the license plate is the exiting vehicle, and determines the exit parking event information of the vehicle identified by the license plate; wherein the exit parking event information comprises the license plate number, an exit time, the parking space, an exit key point image, an exit key time-series image, and an exit tracking video, wherein the vehicle is located in the parking space when an exit parking event occurs.

7. The parking management device according to claim 6, wherein, further comprising:

an operation management interface, configured to receive a first query instruction input by a user, wherein the first query instruction is an operation, wherein the user selects the operation to query monitoring information of the camera;

the operation management interface is further configured to acquire a first monitoring area image captured by the camera according to the first query instruction, display the first monitoring area image, receive coordinates of a tracking detection area of the plurality of tracking detection areas, wherein the tracking detection area is selected by the user in the monitoring area image; and an image division rule of the camera is based on the coordinates of the tracking detection area.

8. The parking management device according to claim 7, wherein, the detection recognition tracking module further comprises an operation judgment module, and the operation judgment module is configured to:

obtain a positional relationship between the license plate and the vehicle, determine, when a license plate area of the license plate is located in a vehicle area of the vehicle, a first result of the license plate detection and the vehicle detection, wherein the first result indicates that both the vehicle and the license plate of the vehicle and the license plate number of the vehicle are/is detected, determine, when the license plate area of the license plate is not located in the vehicle area of the vehicle, a second result of the license plate detection and the vehicle detection, wherein the second result indicates that only the license plate and the license plate number of the license plate are/is detected, and the vehicle identified by the license plate is not detected, and determine, when the vehicle area of the vehicle does not contain the license plate area of the license plate, a third result of the license plate detection and the vehicle detection, wherein the third result indicates that only the vehicle is detected and the license plate of the vehicle is not detected.

9. The parking management device according to claim 8, wherein, when the license plate is located in a parking space area and the license plate number of the license plate is recognized by the license plate recognition module, the tracking processing module searches an on-the-spot vehicle information table to determine whether the license plate number has been recorded in the on-the-spot vehicle information table according to the license plate number; when the license plate number is not recorded in the on-the-spot vehicle information table, the tracking processing module determines that the vehicle identified by the license plate is an entering vehicle, and determines and records entry parking event information of the vehicle identified by the license plate, wherein the entry parking event information of the vehicle identified by the license plate comprises the license plate number of the vehicle, an entry time of the vehicle, and a parking space, wherein the vehicle is located in the parking space; and when the license plate is located in an entry detection area or an exit detection area, the tracking processing module calculates a first time, wherein the license plate stays in the entry parking area or the exit parking area for the first time; when the first time exceeds a first threshold, determining that the vehicle identified by the license plate is an illegal vehicle, and a parking event of the vehicle identified by the license plate is an illegal parking event.

* * * * *